(12) United States Patent
Kim et al.

(10) Patent No.: US 12,232,132 B2
(45) Date of Patent: Feb. 18, 2025

(54) METHOD AND USER EQUIPMENT FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Seonwook Kim, Seoul (KR); Kijun Kim, Seoul (KR); Sukhyon Yoon, Seoul (KR); Suckchel Yang, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 394 days.

(21) Appl. No.: 17/637,418

(22) PCT Filed: Aug. 24, 2020

(86) PCT No.: PCT/KR2020/011237
§ 371 (c)(1),
(2) Date: Feb. 22, 2022

(87) PCT Pub. No.: WO2021/040348
PCT Pub. Date: Mar. 4, 2021

(65) Prior Publication Data
US 2022/0287012 A1 Sep. 8, 2022

(30) Foreign Application Priority Data
Aug. 23, 2019 (KR) .................. 10-2019-0104062

(51) Int. Cl.
*H04W 72/23* (2023.01)
*H04L 5/00* (2006.01)
*H04L 27/26* (2006.01)

(52) U.S. Cl.
CPC ........... *H04W 72/23* (2023.01); *H04L 5/0053* (2013.01); *H04L 27/2634* (2013.01)

(58) Field of Classification Search
None
See application file for complete search history.

(56) References Cited

U.S. PATENT DOCUMENTS 9,461,801 B2 * 10/2016 Oizumi ................ H04L 5/0053
2013/0128857 A1 * 5/2013 Nakao .................... H04L 5/001
370/329

(Continued)

FOREIGN PATENT DOCUMENTS

| KR | 1020130075714 A | 7/2013 |
| KR | 1020190027925 A | 3/2019 |
| WO | 2017155564 A1 | 9/2017 |

OTHER PUBLICATIONS

International Search Reprot from PCT/KR2020/011237, dated Nov. 30, 2020.

(Continued)

*Primary Examiner* — Diane L Lo
(74) *Attorney, Agent, or Firm* — BRYAN CAVE LEIGHTON PAISNER LLP

(57) ABSTRACT

The present disclosure relates to a wireless communication system and, particularly, to a method and a device therefor, the method comprising the steps of: receiving a PDCCH on the basis of a DFT-s-OFDM symbol from a base station; and obtaining DCI from the received PDCCH, wherein the PDCCH is mapped to one or more DET-s-OFDM symbols, the PDCCH is generated by means of one or more DFT calculations and one IFFT calculation applied to a plurality of modulation symbols respectively corresponding to the one or more DFT-s-OFDM symbols, and a plurality of modulation symbols input for at least one DFT calculation (Continued)

among the one or more DFT calculations configure one resource group.

16 Claims, 19 Drawing Sheets

(56) References Cited

U.S. PATENT DOCUMENTS

| | | | |
|---|---|---|---|
| 2013/0322397 A1 | 12/2013 | Lee et al. | |
| 2017/0041910 A1* | 2/2017 | Yang | H04L 5/0041 |
| 2022/0078767 A1* | 3/2022 | Xiong | H04L 27/2636 |

OTHER PUBLICATIONS

Written Opinion of the ISA from PCT/KR2020/011237, dated Nov. 30, 2020.

* cited by examiner

Non - interleaved CCE - to - REG mapping

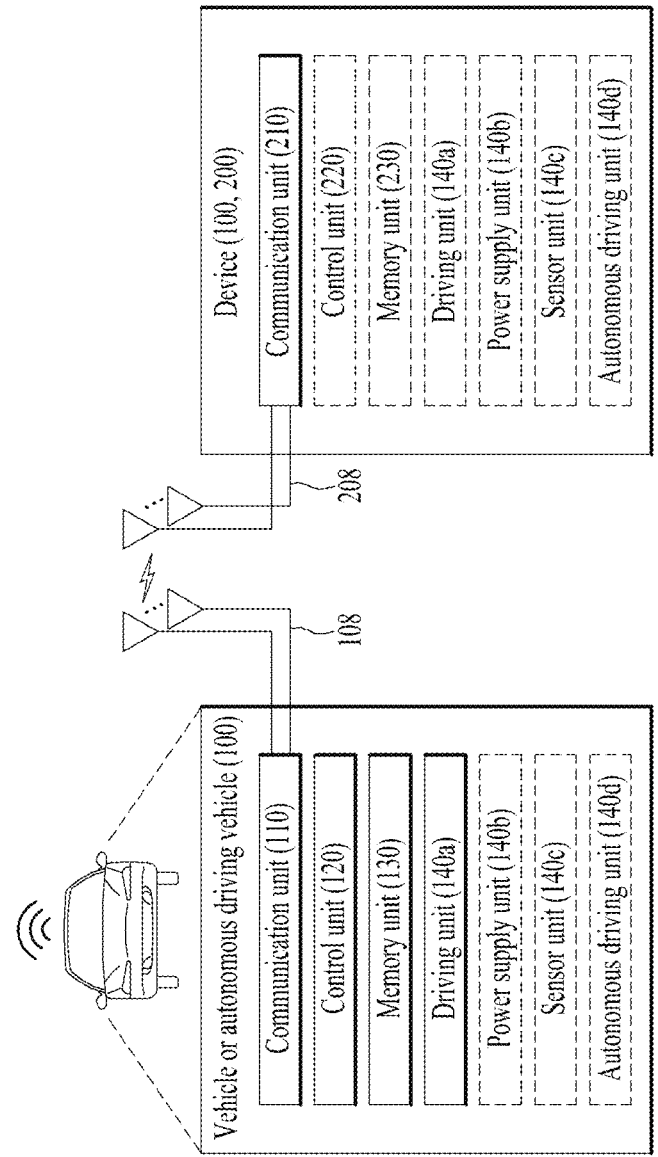

METHOD AND USER EQUIPMENT FOR RECEIVING DOWNLINK SIGNAL, AND METHOD AND BASE STATION FOR TRANSMITTING DOWNLINK SIGNAL

This application is the National Stage filing under 35 U.S.C. 371 of International Application No. PCT/KR2020/011237 filed on Aug. 24, 2020, which claims priority to Korean Patent Application No. 10-2019-0104062 filed on Aug. 23, 2019, the contents of which are all hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with a first aspect of the present disclosure, a method for receiving a downlink signal by a user equipment (UE) in a wireless communication system may include receiving, from a base station (BS), a physical downlink control channel (PDCCH) based on a DFT-s-OFDM (Discrete Fourier Transform-spread-Orthogonal Frequency Division Multiplexing) symbol; and obtaining downlink control information (DCI) from the received PDCCH. The PDCCH may be mapped to one or more DFT-s-OFDM symbols, and the PDCCH may be generated by applying one or more DFT operations and one inverse fast Fourier transform (IFFT) operation to a plurality of modulation symbols corresponding to each of the one or more DFT-s-OFDM symbols. A plurality of modulation symbols being input for at least one DFT operation among the one or more DFT operations may constitute one resource group.

In accordance with a second aspect of the present disclosure, a user equipment (UE) configured to receive a downlink signal in a wireless communication system may include at least one processor; and at least one computer memory operatively connected to the at least one processor, and configured to store instructions such that the at least one processor performs specific operations by executing the instructions. The specific operations may include: receiving, from a base station (BS), a physical downlink control channel (PDCCH) based on a DFT-s-OFDM (Discrete Fourier Transform-spread-Orthogonal Frequency Division Multiplexing) symbol; and obtaining downlink control information (DCI) from the received PDCCH. The PDCCH is mapped to one or more DFT-s-OFDM symbols, and the PDCCH is generated by applying one or more DFT operations and one inverse fast Fourier transform (IFFT) operation to a plurality of modulation symbols corresponding to each of the one or more DFT-s-OFDM symbols. A plurality of modulation symbols being input for at least one DFT operation among the one or more DFT operations may constitute one resource group.

In accordance with a third aspect of the present disclosure, a device for a user equipment (UE) may include at least one processor; and at least one computer memory operatively connected to the at least one processor, and configured to store instructions such that the at least one processor performs specific operations by executing the instructions. The specific operations may include: receiving, from a base station (BS), a physical downlink control channel (PDCCH) based on a DFT-s-OFDM (Discrete Fourier Transform-spread-Orthogonal Frequency Division Multiplexing) symbol; and obtaining downlink control information (DCI) from the received PDCCH. The PDCCH may be mapped to one or more DFT-s-OFDM symbols, and the PDCCH may be generated by applying one or more DFT operations and one inverse fast Fourier transform (IFFT) operation to a plurality of modulation symbols corresponding to each of the one or more DFT-s-OFDM symbols. A plurality of modulation symbols being input for at least one DFT operation among the one or more DFT operations may constitute one resource group.

In accordance with a fourth aspect of the present disclosure, a method for transmitting a downlink signal by a base station (BS) in a wireless communication system may include generating a physical downlink control channel (PDCCH) based on a DFT-s-OFDM (Discrete Fourier Transform-spread-Orthogonal Frequency Division Multiplexing) symbol; and transmitting the generated PDCCH to a user equipment (UE). The PDCCH may be mapped to one or more DFT-s-OFDM symbols, and the PDCCH may be generated by applying one or more DFT operations and one inverse fast Fourier transform (IFFT) operation to a plurality of modulation symbols corresponding to each of the one or more DFT-s-OFDM symbols. A plurality of modulation symbols being input for at least one DFT operation among the one or more DFT operations may constitute one resource group.

In accordance with a fifth aspect of the present disclosure, a base station (BS) configured to transmit a downlink signal in a wireless communication system may include at least one processor; and at least one computer memory operatively connected to the at least one processor, and configured to store instructions such that the at least one processor performs specific operations by executing the instructions. The specific operations may include: generating a physical downlink control channel (PDCCH) based on a DFT-s-OFDM (Discrete Fourier Transform-spread-Orthogonal Frequency Division Multiplexing) symbol; and transmitting the generated PDCCH to a user equipment (UE). The PDCCH may be mapped to one or more DFT-s-OFDM symbols, and the PDCCH may be generated by applying one or more DFT operations and one inverse fast Fourier transform (IFFT) operation to a plurality of modulation symbols corresponding to each of the one or more DFT-s-OFDM symbols. A plurality of modulation symbols being input for at least one DFT operation among the one or more DFT operations may constitute one resource group.

In accordance with a sixth aspect of the present disclosure, a device for a base station (BS) may include at least one processor; and at least one computer memory operatively connected to the at least one processor, and configured to store instructions such that the at least one processor performs specific operations by executing the instructions. The specific operations may include generating a physical downlink control channel (PDCCH) based on a DFT-s-OFDM (Discrete Fourier Transform-spread-Orthogonal Frequency Division Multiplexing) symbol; and transmitting the generated PDCCH to a user equipment (UE). The PDCCH may be mapped to one or more DFT-s-OFDM symbols, and the PDCCH may be generated by applying one or more DFT operations and one inverse fast Fourier transform (IFFT) operation to a plurality of modulation symbols corresponding to each of the one or more DFT-s-OFDM symbols. A plurality of modulation symbols being input for at least one DFT operation among the one or more DFT operations may constitute one resource group.

The one resource group may include a resource element group (REG), a resource element group (REG) bundle, or a control channel element (CCE).

The REG bundle and the CCE may be determined based on the number (N1) of DFT-s-OFDM symbols configured by the base station (BS) and the number (N2) of DFT operations corresponding to each of the N1 DFT-s-OFDM symbols.

The input size of each of the one or more DFT operations may be equal to or smaller than the input size of the IFFT operation.

The method may further include receiving a physical downlink shared channel (PDSCH) from the base station (BS) based on the PDCCH; and transmitting, to the base station (BS), a HARQ-ACK (hybrid automatic repeat and request-acknowledgement/negative-ACK) corresponding to the PDSCH. A processing time between a reception time point of the PDSCH and a transmission time point of the HARQ-ACK may be determined based on the number of the one or more DFT operations.

The DCI may include scheduling information of a physical uplink shared channel (PUSCH). The method may further include transmitting the scheduled PUSCH. A processing time between a reception time point of the PDCCH and a transmission time point of the PUSCH may be determined based on the number of the one or more DFT operations.

A demodulation reference signal (DM-RS) may be received along with the PDCCH based on the DFT-s-OFDM symbol, wherein a plurality of modulation symbols corresponding to the one DFT-s-OFDM symbol includes PDCCH modulation symbols and DM-RS modulation symbols, and a guard symbol is located between the PDCCH modulation symbols and the DM-RS modulation symbols.

The guard symbol may include a null symbol or a predetermined particular symbol.

The PDCCH modulation symbols and the DM-RS modulation symbols may be used as inputs of one DFT operation.

Advantageous Effects

According to the present disclosure, a wireless signal may be efficiently transmitted and received in a wireless communication system.

According to the present disclosure, since a waveform having a low PAPR (Peak-to-Average Power Ratio) is applied to downlink (DL) transmission, it can be effective in terms of linearity of a Power Amplifier (PA) of a base station (BS).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this specification, illustrate embodiments of the disclosure.

FIG. 19 illustrates a vehicle or an autonomous driving vehicle applied to the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA 2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

1. Physical Channel and Frame Structure

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
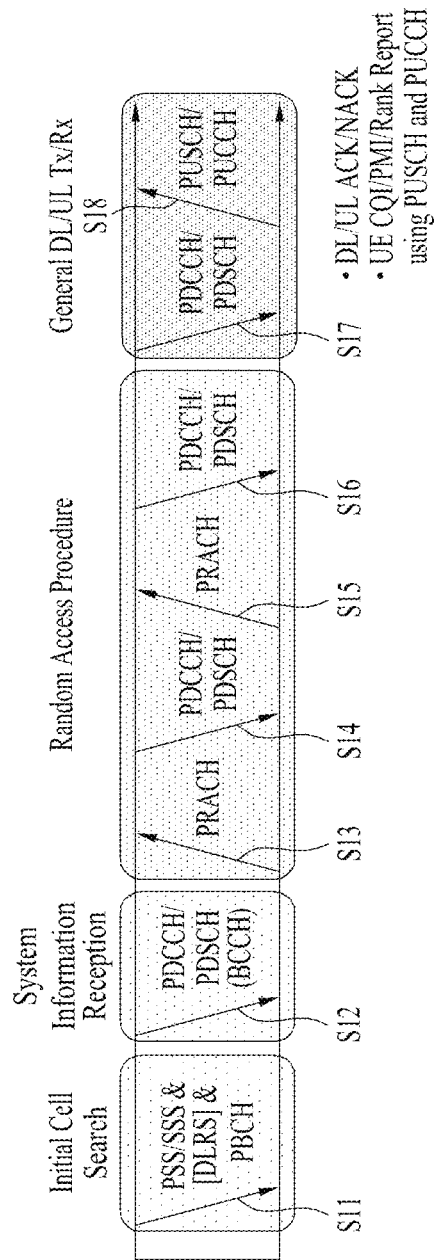
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
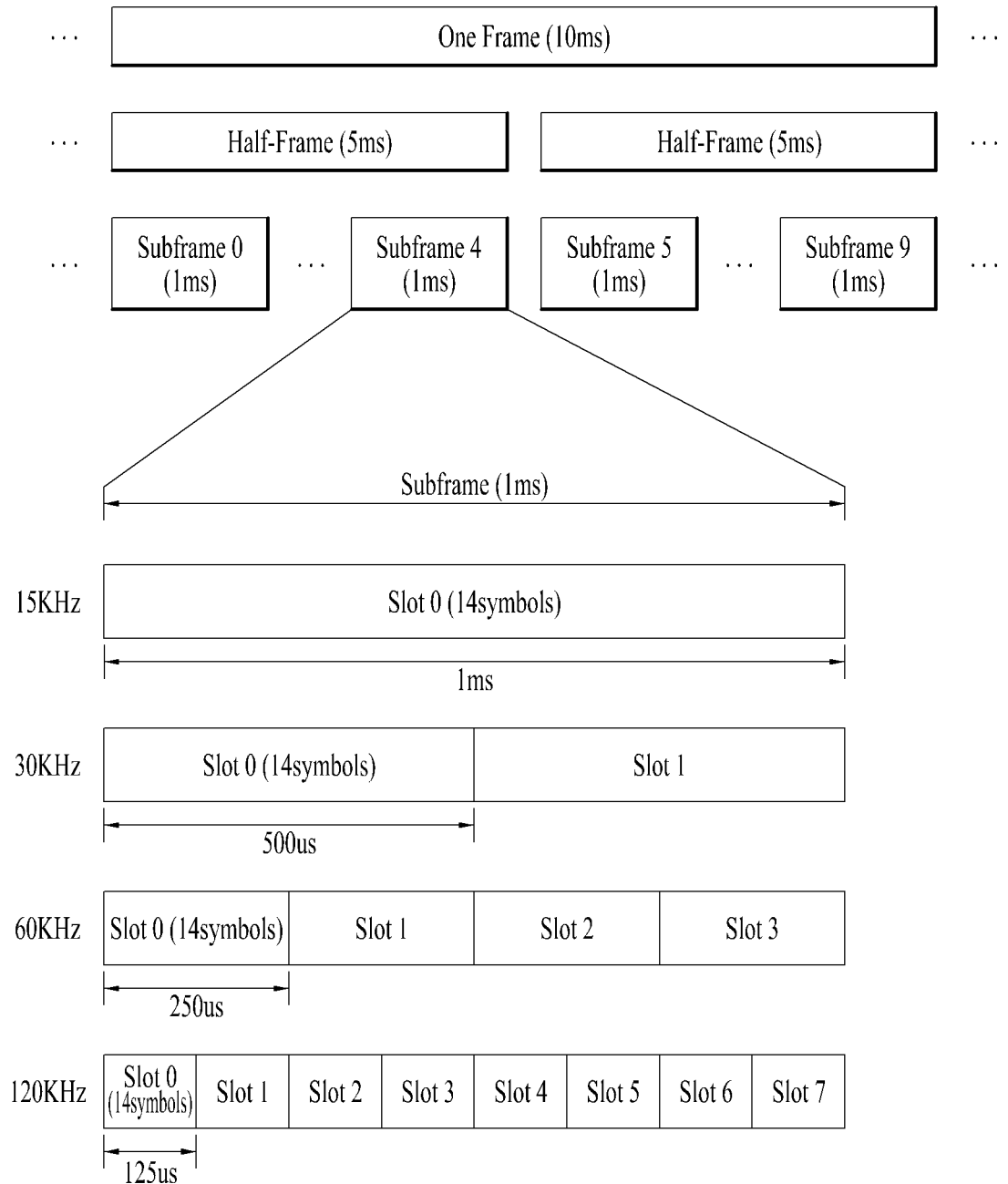
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol). NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
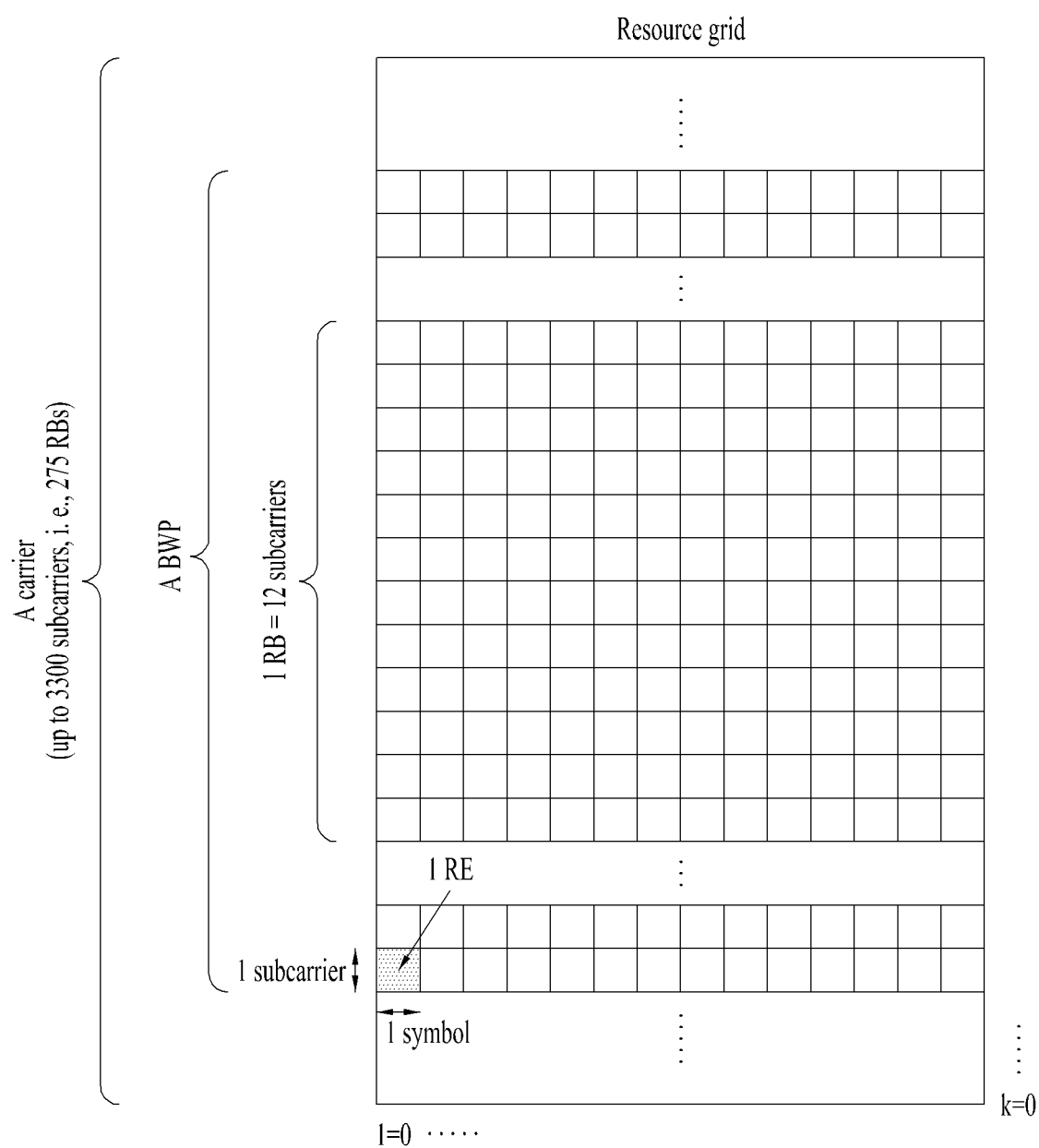
FIG. 3 illustrates a resource grid of a slot.
Figure 4:
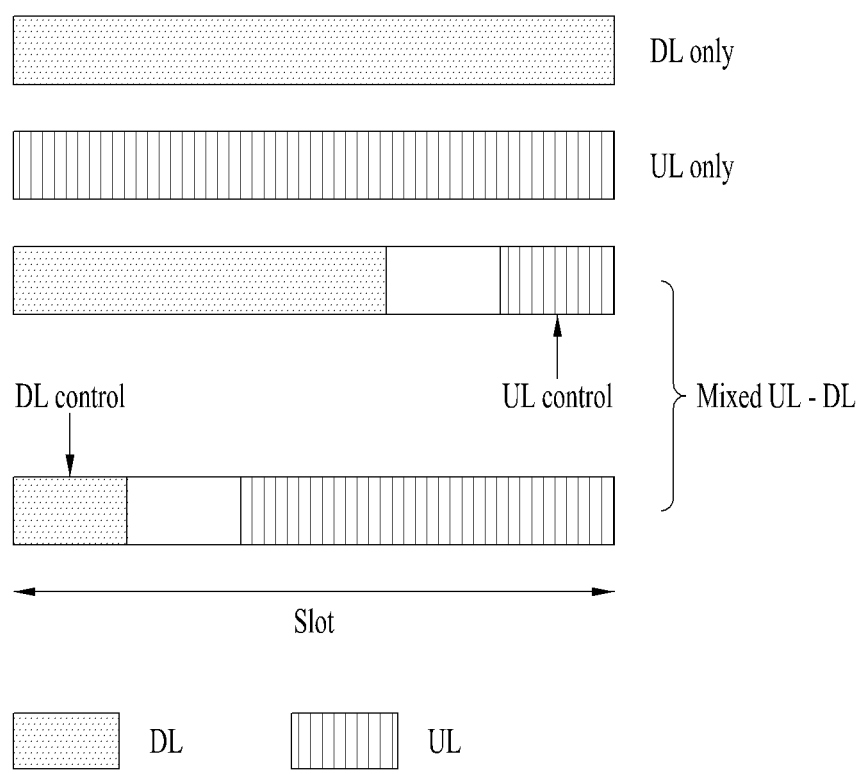
FIG. 4 illustrates a self-contained slot structure.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped. FIG. 4 illustrates an example of the structure of a self-contained slot. In an NR system, a frame is characterized by a self-contained structure in which a DL control channel, DL or UL data, a UL control channel, etc., can all be contained in one slot. For example, the first N symbols in a slot may be used to transmit a DL control channel (hereinafter referred to as a DL control area), and the last M symbols in a slot may be used to transmit UL control channels (hereinafter referred to as a UL control area). N and M may each be an integer of 0 or more. A resource area (hereinafter referred to as a data area) between the DL control area and the UL control area may be used for DL data transmission or UL data transmission. For example, the following configuration may be implemented. Each section is listed in chronological order.
1. DL only configuration
2. UL only configuration
3. Mixed UL-DL configuration
   DL area guard period (GP)+UL control area
   DL control area GP UL area
   DL area: (i) DL data area, (ii) DL control area DL data area
   UL area: (i) UL data area, (ii) UL data area UL control area The PDCCH may be transmitted in the DL control region, and the PDSCH may be transmitted in the DL data region. Analogously, in the UL control region, the PUCCH may be transmitted, and in the UL data region, the PUSCH can be transmitted. The PDCCH may transmit Downlink Control Information (DCI), such as, for example, DL data scheduling information, UL data scheduling information, and the like. The PUCCH may transmit Uplink Control Information (UCI), such as, for example, ACK/NACK information, DL CSI information, and Scheduling Request (SR), and the like. The GP provides a time gap in the process of switching from a transmission mode to a reception mode, or switching from the reception mode to the transmission mode. A portion of symbols within a subframe can be set to GP for switching from DL to UL.

2. Uplink (UL) and Downlink (DL) Channel Structures
DL Channel Structures

An eNB transmits related signals on later-described DL channels to a UE, and the UE receives the related signals on the DL channels from the eNB.
(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually scrambled and modulated, and modulation symbols of each codeword are mapped to one or more layers. An OFDM signal is generated by mapping each layer together with a DMRS to resources, and transmitted through a corresponding antenna port.
(2) Physical Downlink Control Channel (PDCCH)

Figure 5:
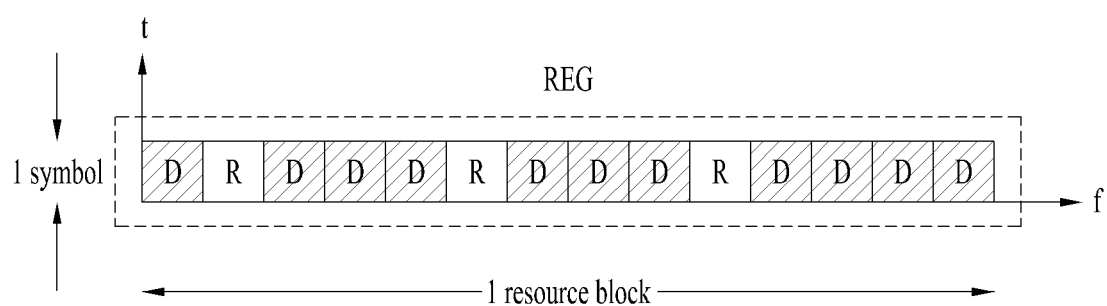
FIG. 5 illustrates an exemplary structure of one REG.

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)). FIG. 5 illustrates an exemplary structure of one REG. In FIG. 5, D represents an RE to which DCI is mapped, and R represents an RE to which a DMRS is mapped. The DMRS is mapped to 1st, 5th, and 9th RE along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:
   sameAsREG-bundle: It equals to an REG bundle size in the frequency domain.
   allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

Figure 6:
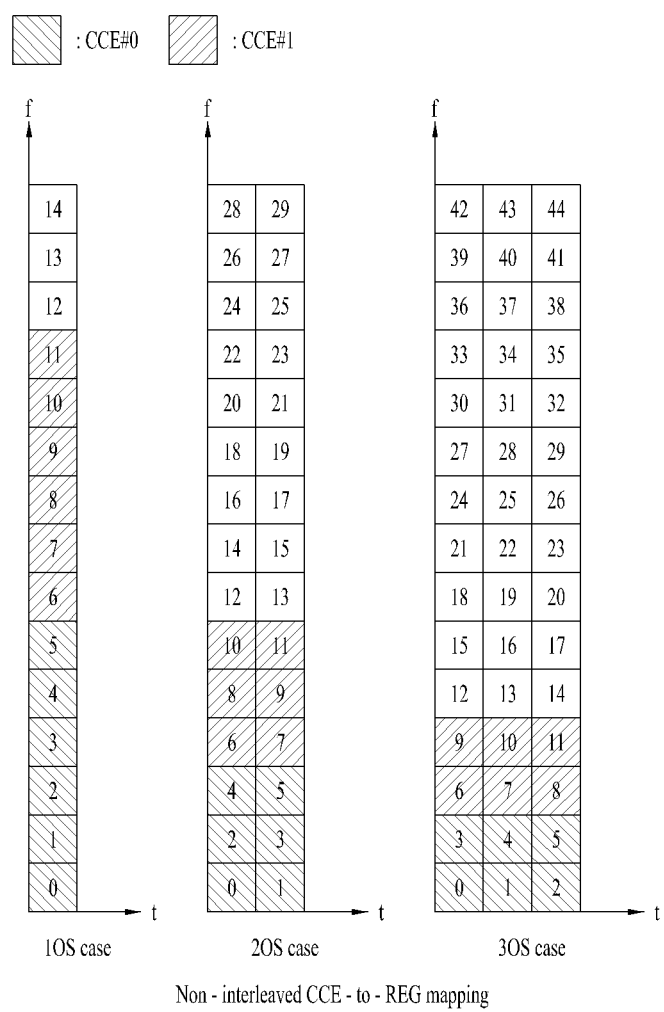
FIG. 6 is an exemplary view illustrating non-interleaved CCE-REG mapping.
Figure 7:
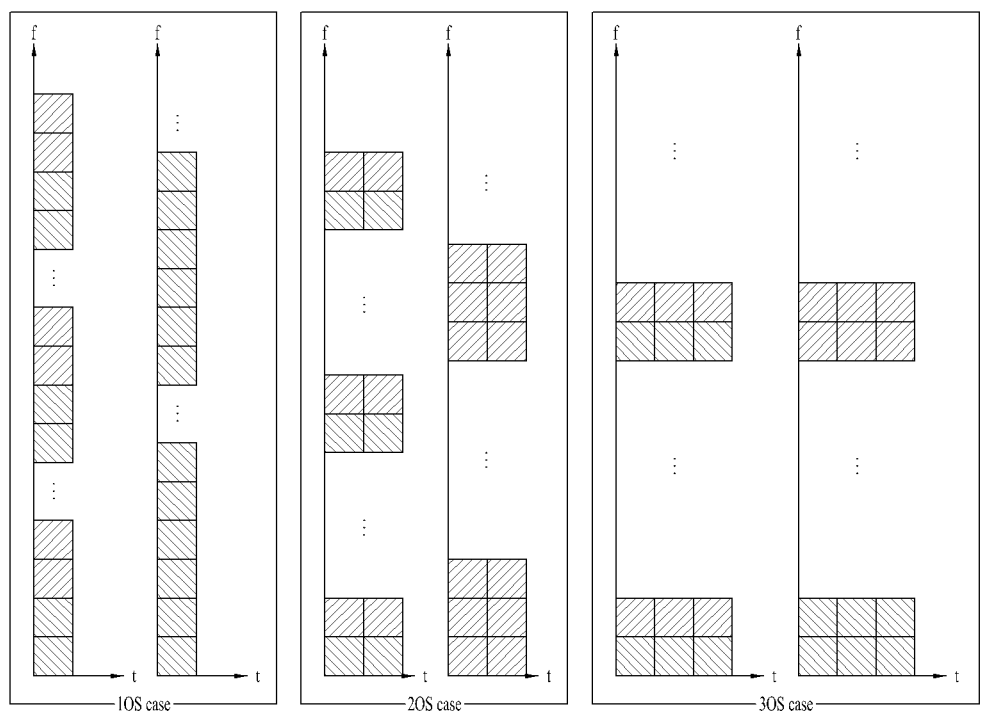
FIG. 7 is an exemplary view illustrating interleaved CCE-REG mapping.

CCE-to-REG mapping for the CORESET may be an interleaved type or a non-interleaved type. FIG. 6 is an exemplary view illustrating non-interleaved CCE-REG mapping, and FIG. 7 is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 8:
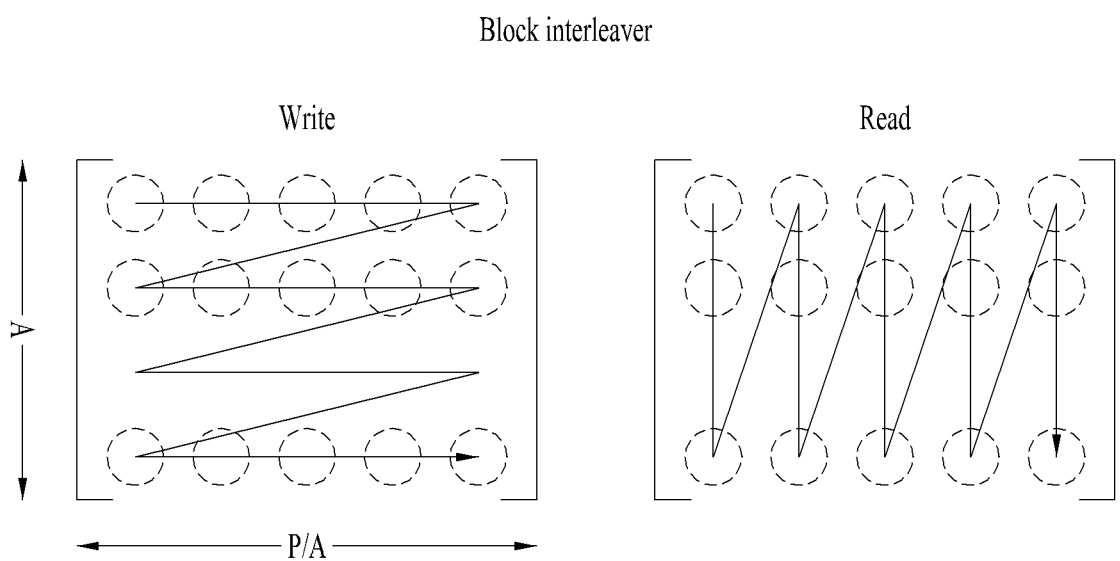
FIG. 8 illustrates an exemplary block interleaver.
Figure 11:
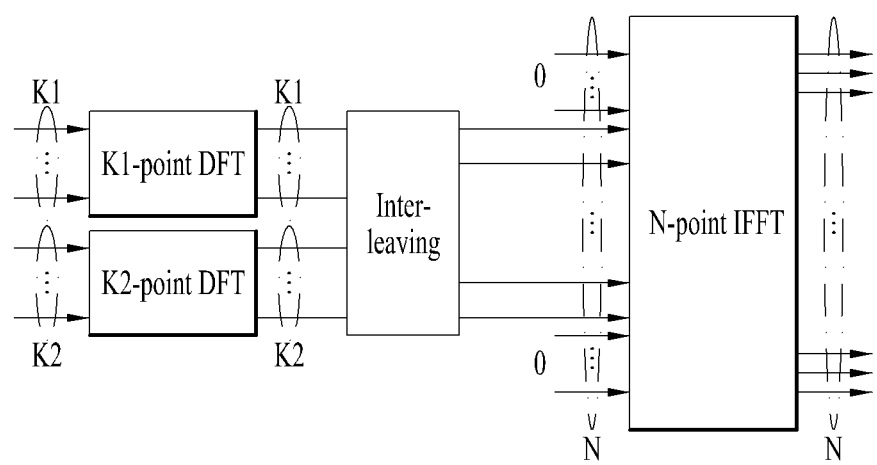

FIG. 8 illustrates an exemplary block interleaver. For the above interleaving operation, the number of rows in a (block) interleaver is set to one or 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. 11. Cyclic shift (CS) of an interleaving unit is applied based on an ID which is configurable independently of a configurable ID for the DMRS.

A UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in unit of slot) and a PDCCH monitoring offset (in unit of slot).

monitoringSymbolsWithinSlot: A PDCCH monitoring pattern (e.g., the first symbol(s) in the CORESET) in a PDCCH monitoring slot.

nrofCandidates: The number of PDCCH candidates for each AL=1, 2, 4, 8, 16 (one of 0, 1, 2, 3, 4, 5, 6, and 8).

Table 4 lists exemplary features of the respective search space types.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 4-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 lists exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

Table 6 shows a PDCCH processing procedure described in 3GPP TS 38.211 V 15.6.0 (2019-06). In Table 6, the block of bits b(0), . . . , b(M bit 1) represents a coded DCI bit stream. Table 6 shows a DMRS sequence for PDCCH described in 3GPP TS 38.211 V 15.6.0 (2019-06).

TABLE 6

7.3.2.3 Scrambling

The UE shall assume the block of bits (0), ..., b($M_{bit}$ − 1), where $M_{bit}$ is the number of bits transmitted on the physical channel, is scrambled prior to modulation, resulting in a block of scrambled bits $\tilde{b}(0)$, ..., $\tilde{b}(M_{bit} − 1)$ according to $$\tilde{b}(i) = (b(i) + c(i)) \mod 2$$

where the scrambling sequence c(i) is given by clause 5.2.1. The scrambling sequence generator shall be initialized with $$c_{init} = (n_{RNTI} \cdot 2^{16} + n_{ID}) \mod 2^{31}$$

where
    for a UE-specific search space, $n_{ID} \in \{0, 1, ..., 65535\}$ equals the higher-layer parameter pdcch-DMRS-ScramblingID if configured,
    $n_{ID} = N_{ID}^{cell}$ otherwise
and where
    $n_{RNTI}$ is given by the C-RNTI for a PDCCH in a UE-specific search space if the higher-layer parameter pdcch-DMRS-ScramblingID is configured, and
    $n_{RNTI} = 0$ otherwise.

7.3.2.4 PDCCH modulation

The UE shall assume the block of bits $\tilde{b}(0)$, ..., $\tilde{b}(M_{bit} − 1)$ to be QPSK modulated as described in clause 5.1.3, resulting in a block of complex-valued modulation symbols d(0), .d($M_{symb} − 1$).

73.2.5 Mapping to physical resources

The UE shall assume the block of complex-valued symbols d(0), ..., d($M_{symb} − 1$) to be scaled by a factor $\beta_{PDCCH}$ and mapped to resource elements (k, l)$_{p,\mu}$ used for the monitored PDCCH and not used for the associated PDCCH DMRS in increasing order of first k, then l. The antenna port p = 2000.

5.2.1 Pseudo-random sequence generation

Generic pseudo-random sequences are defined by a length-31 Gold sequence. The output sequence c(n) of length $M_{PN}$, where n = 0, 1, ..., $M_{PN} − 1$, is defined by $$c(n) = (x_1(n+N_C) + x_2(n + N_C)) \mod 2$$
$$x_1(n + 31) = (x_1(n + 3) + x_1(n)) \mod 2$$
$$x_2(n + 31) = (x_2(n + 3) + x_2(n + 2) + x_2(n + 1) + x_2(n)) \mod 2$$

where $N_C = 1600$ and the first m-sequence $x_1(n)$ shall be initialized with $x_1(0) = 1, x_1(n) = 0, n = 1, 2, ..., 30$. The initialization of the second m-sequence, $x_2(n)$, is denoted by $c_{init} = \sum_{i=0}^{30} x_2(i) \cdot 2^i$ with the value depending on the application of the sequence.

TABLE 7

7.4.1.3 Demodulation reference signals for PDCCH
7.4.1.3.1 Sequence generation
The UE shall assume the reference-signal sequence $r_l(m)$ for OFDM symbol l is defined by $$r_l(m) = \frac{1}{\sqrt{2}}(1 - 2 \cdot c(2m)) + j\frac{1}{\sqrt{2}}(1 - 2 \cdot c(2m + 1)).$$

where the pseudo-random sequence c(i) is defined in clause 5.2.1. The pseudo-random sequence generator shall be initialized with $$c_{init} = (2^{17}(N_{symb}^{slot} n_{s,f}^{\mu} + l + 1)(2N_{ID} + 1) + 2N_{ID}) \mod 2^{31}$$

where l is the OFDM symbol number within the slot, $n_{s,f}^{\mu}$ is the slot number within a frame, and
$N_{ID} \in \{0,1, ..., 65535\}$ is given by the higher-layer parameter pdcch-DMRS-ScramblingID if provided
$N_{ID} = N_{ID}^{cell}$ otherwise.

3. Specific Embodiment

In the existing LTE/NR system, downlink transmission may be performed based on OFDM/OFDMA (accurately, CP-OFDM (Cyclic Prefix OFDM)), and uplink transmission may be performed based on DFT-s-OFDM or SC-OFDM (single carrier OFDM). In the NR system, the CP-OFDM based uplink transmission may be added. Unlike downlink transmission, performing uplink transmission based on DFT-s-OFDM or SC-OFDM has advantages in that an uplink (UL) coverage can be extended by applying DFT-s-OFDM having a low PAPR (Peak-to-Average Power Ratio) due to characteristics of uplink transmission having a relatively lower transmission power as compared to the base station (BS).

As the frequency band considering the operation of the NR system increases (e.g., a frequency band higher than 52.6 GHz), a waveform having a low PAPR can be applied to the downlink by considering power amplifier (PA) linearity and the like in both the UE and the BS. As an example of a waveform having a lower PAPR as compared to the existing CP-OFDM scheme, DFT-s-OFDM may be considered, and the DFT-s-OFDM operation to be considered in the present disclosure is as follows.

The DFT-s-OFDM scheme or the SC-OFDM scheme may refer to a scheme for applying DFT preceding (or DFT spreading) to data in the front end of an IDFT (Inverse Discrete Fourier Transform) or IFFT (Inverse Fast Fourier Transform) stage according to the OFDM method. Accordingly, K data generated in the time domain may be processed by the K-point DFT block and the N-point IFFT block (where N K), and data generated in the time domain may be converted into a time-domain signal upsampled at a ratio of N/K.

Figure 9:
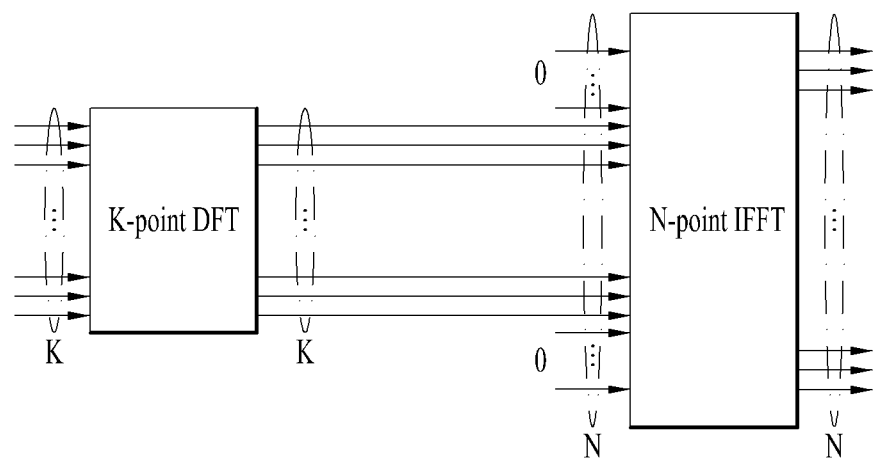
FIGS. 9 to 11 are diagrams illustrating examples of DFT-s-OFDM structures to which the present disclosure can be applied.

Specifically, as shown in FIG. 9, after applying DFT to K input signals/samples, zero-padding is performed at the front end (hereinafter referred to as "IFFT front end") of the IFFT (Inverse Fast Fourier Transform) stage, so that N-point IFFT (where, N>K or N=K) can be performed. For convenience of description, the rear end of DFT (hereinafter referred to as "DFT rear end") or the IFFT front end may be referred to as a frequency domain (f-domain), the DFT front end or pre-DFT may be referred to as a virtual time domain sample, and the IFFT rear end may be referred to as a time domain signal. In this case, the virtual time domain sample may refer to a modulation symbol or a modulation sample described in PDCCH modulation in Section 7.3.2.4 of Table 6.

Figure 10:
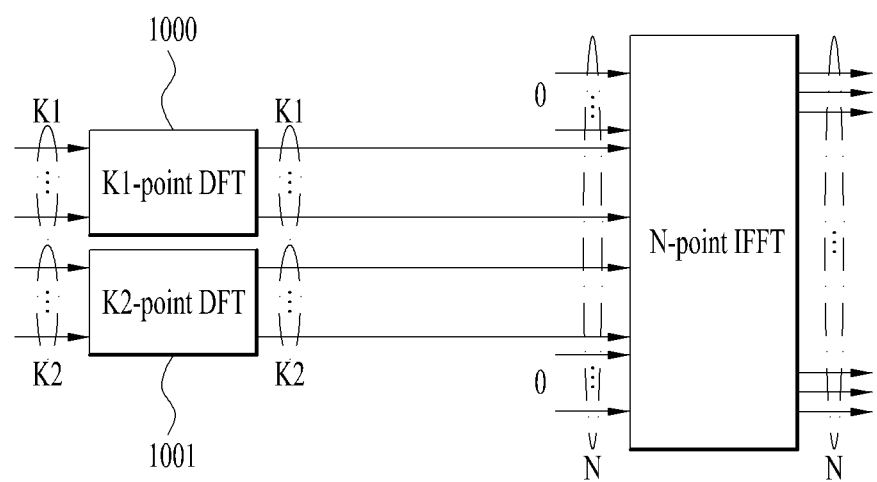

In addition, as shown in FIGS. 9 to 11, applying DFT and IFFT may be represented by a DFT block and an IFFT block, respectively. Hereinafter, for convenience of description, the application of DFT and IFFT may be referred to as a DFT block and an IFFT block, respectively. According to the embodiment, applying DFT and IFFT may be referred to as performing a DFT operation and an IFFT operation, respectively, and is not limited to the above-described example.

The number of DFT blocks corresponding to one IFFT block may be plural. As shown in FIG. 10, after a K1-point DFT is applied to K1 samples of the virtual time domain and a K2-point DFT is applied to K2 samples of the virtual time domain, K1 samples and K2 samples of the generated time domain are successively mapped to the frequency domain. In this case, K1 and K2 may be the same or different values. Alternatively, as shown in FIG. 11, K1 samples and K2 samples are interleaved by a specific rule (e.g., K1 samples are mapped to an even index, K2 samples are mapped to an odd index), and are then mapped to a frequency domain. Although FIG. 11 illustrates an example in which the number of DFT blocks is 2 for convenience of description, the scope or spirit of the present disclosure is not limited thereto, and the present disclosure can also be equally applied to the other example in which the number of DFT blocks is 3 or more.

Figure 12:
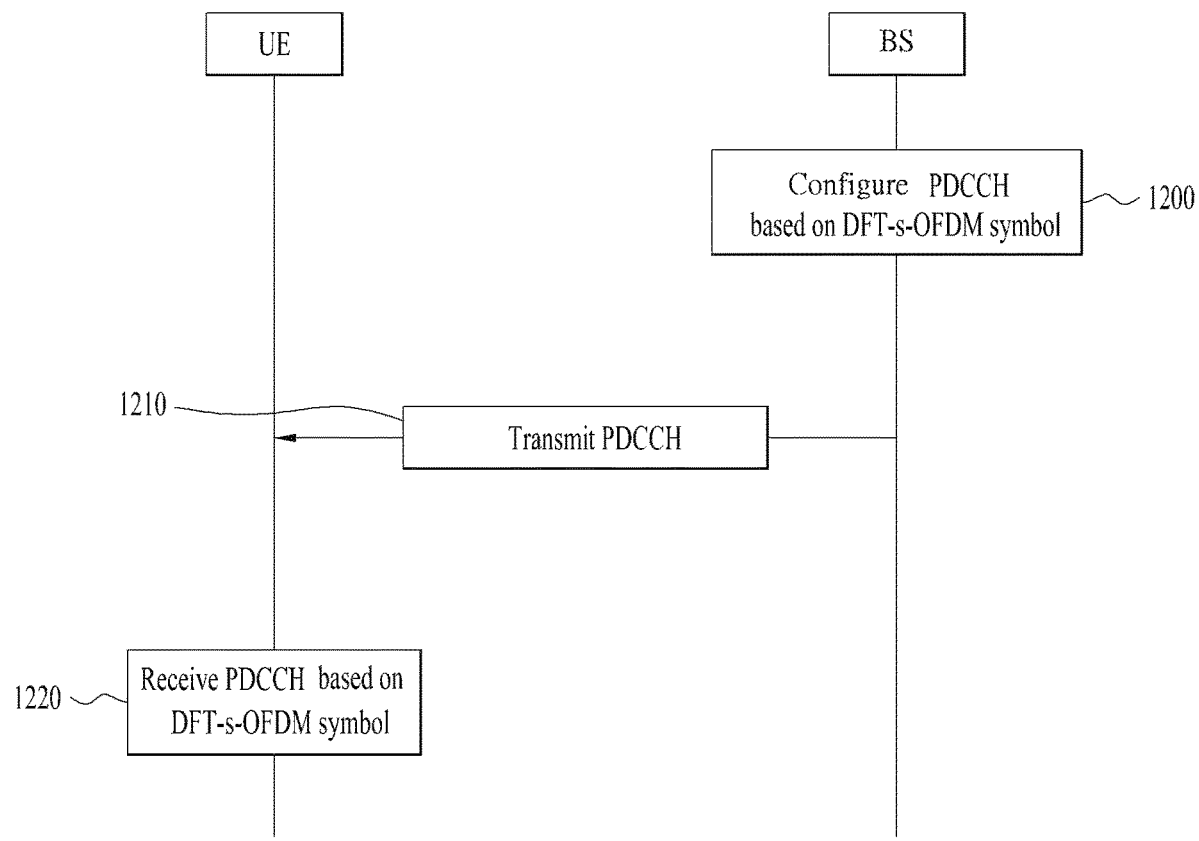
FIG. 12 is a flowchart illustrating an operation for transmitting and receiving a DFT-s-OFDM based PDCCH by a user equipment (UE) and a base station (BS).

The present disclosure provides a downlink control channel structure under the DFT-s-OFDM structure as shown in FIGS. 9 to 11. More specifically, the present disclosure provides a method for constructing a PDCCH by grouping resources of a virtual time domain and a method for transmitting; a DM-RS constructing the corresponding PDCCH. In this case, as shown in FIG. 12, the DET-s-OFDM structure may be constructed in a manner that the base station (BS) constructs (1200) the DFT-s-OFDM based PDCCH (operation 1200) and transmits the PDC CIT to the UE (operation 1210), and the UE receives the PDCCH from the BS (operation 1220). The proposed PDCCH configuration method can be applied to either the entire CC (component carrier)/BWP (bandwidth part) or can be applied in a time-frequency resource region of a control resource set (CORESET) configured in the CC/BWP. Although the above-described example has disclosed a high-frequency band as an environment in which the use of various waveforms is considered, the scope or spirit of the present disclosure is not limited thereto, and the present disclosure can also be applied to other examples in which the number of downlink waveforms capable of being supported by the NR base station (BS) and the UE is defined as a plural number, regardless of the frequency band.

3.1 Resource Grouping Method

In the existing NR system, the concepts of the following resource groups have been introduced to configure one PDCCH.

REG (Resource Element Group): One group (REG) may include 12 REs which are consecutive in the frequency domain within one OFDM symbol, three REs (each RE index starts from zero '0') corresponding to RE indexes #1, #5, and #9 within the corresponding 12 RE sets may be composed of DM-RSs, and DCI signals may be mapped to the remaining nine REs.

REG Bundle: One REG bundle may be configured as 2, 3, or 6 consecutive REGs. For example, 2, 3, or 6 consecutive REGs in the frequency domain and/or the time domain may be configured as one REG bundle.

Control Channel Element (CCE): One CCE may include 6 REGs, interleaving may be performed based on the size of an REG bundle, etc., and CCE-to-REG mapping may be applied thereto. Alternatively, 6 consecutive REGs may be configured as one CCE in a non-interleaved manner.

Aggregation Level (AL): AL may refer to the number of CCEs constituting one PDCCH. For example, in the case of a PDCCH composed of two CCEs, AL may be set to 2, and one PDCCH may be composed of 1, 2, 4, 8, or 16 CCEs.

The present disclosure proposes a method for grouping resources for each sample or for a plurality of samples (i.e., a group of samples) in a virtual time domain. Methods proposed below may be used as an REG configuration method, may be used as an REG bundle configuration method of REGs or a CCE configuration method, and may also be used as a PDCCH configuration method of CCEs. Also, as shown in FIGS. 9 to 11, the methods proposed below may be associated with the number of DFT blocks, and may be configured/applied regardless of the number of DFT blocks. For example, when the proposed methods are related to the number of DFT blocks, Method #1 may be applied to a single-DFT block, and Method #2 may be applied to a multi-DFT block.

In addition, the virtual time domain sample for use in the PDCCH processing procedure may correspond to $d(0), \ldots, d(M_{symb}-1)$ described in the existing 3GPP 38.211 V15.6.0 (2019-06), 7.3.2.4 section PDCCH modulation (see Table 6). In addition, the virtual time domain sample may correspond to the output value of 1020 shown in FIG. 17 or an input value of 1050/1060 shown in FIG. 17, which will be described later.

[Method #1] Resource grouping at DFT-s-OFDM symbol level

All resources or resource groups in one DFT-s-OFDM symbol may be defined as one resource group. In this case, a resource/resource group (i.e., a resource or a resource group) may be defined as a virtual time domain or a frequency domain resource/resource group. For example, the resource/resource group may refer to a virtual time domain or a frequency domain resource/resource group. For example, all virtual time domain samples in one DFT-s-OFDM symbol may be defined as only one CCE. In this case, the number of ALs may correspond to the number of DFT-s-OFDM symbols, and CCE may be a set of REGs composed of some virtual time domain samples included in the DFT-s-OFDM symbol. Here, all resources, resource groups, or virtual time domain samples in one DFT-s-OFDM symbol may mean all resources, resource groups, or virtual time domain samples in DFT block(s) (e.g., K of FIG. 9, and K1+K2 of FIGS. 10 and 11). The size of the DFT block(s) may be predefined or may be configured or instructed by the base station (BS).

As another example, one DFT-s-OFDM symbol may be generated based on a single DFT block, and the virtual time domain samples, which are input signals of the corresponding DFT, may be composed of one coded DCI (e.g., d(0), . . . , d($M_{symb}$-1) described in the existing 3GPP TS 38.211 V15.6.0 (2019-06), section 7.3.2.4 PDCCH modulation), so that one encoded DCI can be mapped/transmitted to one DFT-s-OFDM symbol. Accordingly, a PDCCH carrying one DCI signal and one DCI may be mapped/configured to one or more DFT-S-OFDM symbols. Accordingly, when one DFT-s-OFDM symbol is defined as one CCE, the AL may be defined as the number of DFT-s-OFDM symbols (i.e., the number of CCEs) constituting a single PDCCH. At this time, the entire virtual time domain sample set that is input to the single DFT block may be divided into a plurality of sample groups, and each sample group may be configured/defined as one REG or one REG bundle.

[Method #2] Resource Grouping at DFT Block Level

All virtual time domain resources or all resource groups in one DFT block may be defined as one resource group. For example, as shown in the structures of FIGS. 10 and 11, K1 virtual time domain samples in the first DFT block 1000 may be defined as one CCE, or K2 virtual time domain samples in the second DFT block 1001 may be defined as one CCE. That is, all virtual time domain resources (K1 samples, K2 samples) in each DFT block may be defined as one resource group (CCE). At this time, the number of ALs may correspond to the number of DFT blocks, and may be determined by a combination with the number of DFT-S-OFDM symbols. In addition, the CCE may be a set of REGs composed of some virtual time domain samples from among K1 or K2 samples. That is, all virtual time domain resource groups (i.e., a set of REGs composed of some virtual time domain samples from among K1 or K2 samples) in each DFT block may be defined as one resource group (CCE).

Alternatively, all virtual time domain resources or all resource groups in a plurality of DFT blocks may be defined as one resource group again. For example, in the structures of FIGS. 10 and 11, (K1+K2) virtual time domain samples may be defined as one CCE. In this case, the number of ALs may correspond to the number of DFT blocks, and may be determined by a combination of the number of DFT blocks and the number of DFT-s-OFDM symbols. Further, the CCE may be a set of REGs composed of some virtual time domain samples of K1, K2, or K1+K2 samples.

As another example, one DFT-s-OFDM symbol may be generated based on a plurality of DFT blocks, and one IFFT may be applied to the plurality of DFT blocks. The virtual time domain samples input to each DFT block may be composed of one encoded DCI signal, and the same DCI signal or different DCI signals may be mapped to the plurality of DFT blocks. Accordingly, one DCI signal and a PDCCH carrying one DCI may be mapped/configured to one or more DFT blocks, and a plurality of DFT blocks may be configured in one or more DFT-s-OFDM symbols. Accordingly, when one DFT block group composed of one or more DFT blocks in one or more DFT-s-OFDM symbols is defined as one CCE, the AL may be defined as the number of DFT block groups constituting one PDCCH (i.e., the number of CCEs). At this time, in a state in which the entire virtual time domain sample set applied to one DFT block is divided into a plurality of sample groups, each sample group may be configured/defined as one REG or one REG bundle. Alternatively, when a plurality of DFT blocks constitutes one DFT block group, the entire virtual time domain sample set applied to one DFT block may be configured/defined as one REG or REG bundle. Alternatively, each DFT block configured to constitute the one DFT-s-OFDM symbol may be mapped to an RE set in a localized manner within a frequency domain corresponding to the IFFT input stage or may be mapped to an RE set in a distributed manner within the frequency domain corresponding to the IFFT input stage.

[Method #3] Resource Grouping at Virtual Time Domain Sample

Some virtual time domain resources or resource groups in one DFT block may be defined as one new resource group. For example, referring to FIG. 9, K'(<K) virtual time domain samples, which are some of the K virtual time domain samples, may be defined as one CCE. In this case, the number of ALs may correspond to a function of K', or may be determined by a combination of K' and the number of DFT-s-OFDM symbols. Also, the CCE may be a set of REGs composed of some virtual time domain samples among K' samples.

In this case, a guard sample may be inserted between K' (or a multiple of K') virtual time domain samples so that the guard sample may be used to reduce interference between sample groups. In this case, each sample group may include K' virtual time domain samples. For example, the guard sample may be a null sample or a known sample carrying a specific signal.

As another example, in a situation where one DFT-s-OFDM symbol is generated based on one or more DFT blocks, and a total virtual time domain sample set applied to each DFT block may be divided into a plurality of sample groups (referred to as "SPG (Sample Group)"), and one SPG may be composed of one encoded DCI signal. At this time, the same DCI signal or different DCI signals may be mapped between the plurality of SPGs. Accordingly, a PDCCH carrying one DCI signal and one DCI may be mapped/configured to one or more SPGs, a plurality of SPGs may be configured across one or more DFT blocks, and a plurality of DFT blocks may be configured in one or more DFT-s-OFDM symbols. Accordingly, when one SPG set composed of one or more SPGs is defined as one CCE, the AL may be defined as the number of SPG sets constituting one PDCCH (i.e., the number of CCEs). In this case, the one or more SPGs may be located either in one or more DFT blocks or in one or more DFT-s-OFDM symbols. In addition, in a situation where all samples in one SPG are classified into a plurality of sample groups, each sample group may be configured/defined as one REG or REG bundle, or the entire sample set in one SPG may be configured/defined as an REG or REG bundle.

Meanwhile, a guard period/sample may be inserted between a plurality of SPGs being input to one DFT block. For example, for each of the plurality of SPGs, a guard interval/sample may be inserted when different DCI signals are mapped to different UEs. As described above, the guard sample may include a known sample carrying a null sample or a specific signal, without being limited thereto.

According to the above-described Method #1, all resource/resource groups constituting one DFT-s-OFDM symbol may be defined as one new resource group. According to the above-described Method #2, all resource/resource groups constituting one DFT block may be defined as one new resource group. According to the above-described Method #3, some resource/resource groups constituting one DFT block may be defined as one new resource group. That is, the size of grouped resources or the size of grouped resource groups may decrease in the direction from Method #1 to Method #3. In Method #1, grouping is performed in units of DFT-s-OFDM symbols, so that Method #1 may be more efficient in terms of complexity of signal processing. In Method #3 from among the above-described methods, grouping is performed based on the smallest unit (i.e., some resources/resource groups constituting the DFT block), so that Method #3 may be considered more efficient in terms of multiplexing. In addition, in Method #2, grouping is performed in units of the DFT block, so that Method #2 may be more efficient in terms of signal processing than Method #3 or may be more efficient in terms of multiplexing than Method #1.

Hereinafter, an embodiment of a method for configuring an REG/REG bundle/CCE/PDCCH based on the above-described methods will hereinafter be described.

[Embodiment #1]: REG Configuration Method

1-1: All samples (e.g., K samples of FIG. 9, (K1+K2) samples of FIGS. 10 and 11) within a single DFT-s-OFDM symbol may be configured as one REG.
1-2: Samples (e.g., K1, K2, or (K1+K2) samples of FIGS. 10 and 11) corresponding to one or more DFT blocks within a single DFT-s-OFDM symbol may be configured as one REG.
1-3: Some virtual time domain resources in one DFT block within a single DFT-s-OFDM symbol may be configured as one REG.

[Embodiment #2]: REG Bundle Configuration Method

In the method of Embodiment #1, each REG bundle may be configured by replacing REG(s) with an REG bundle. Specifically, according to Method #1, all resources/resource groups in one DFT-s-OFDM symbol may be configured as one REG bundle. Alternatively, according to Method #2, all virtual domain resources/resource groups in one DFT block may be configured as one REG bundle. Alternatively, according to Method #3, some virtual time domain resources/resource groups in one DFT block may be configured as one REG bundle.

2-1: An REG may be configured as in Embodiment #1-1, and N DFT-s-OFDM symbols (e.g., N is 1 or 2) may be defined as one REG bundle. Specifically, the REG defined in Example #1-1 method may be replaced with the REG bundle. For example, as shown in Embodiment #1-1, all resource/resource groups in one DFT-s-OFDM symbol may be defined as one new resource group. According to Embodiment #2-1, all resources/resource groups in one DFT-s-OFDM symbol may be defined as one REG bundle. Alternatively, according to the embodiment, all resources/resource groups in the plurality of DFT-s-OFDM symbols may be defined as one REG bundle. That is, according to Embodiment #2-1, N resources/N resource groups in the DFT-s-OFDM symbol may be defined as one REG bundle. At this time, N may be pre-defined or may be configured/instructed (by the base station (BS) (e.g., CORESET configuration information).
2-2: An REG may be configured as in Embodiment #1-2, and one REG bundle may be defined as a combination of N1 DFT-s-OFDM symbols and N2 DFT blocks (or N2 DFT block groups). For example, according to Embodiment #1-2, resources may be grouped in units of DFT blocks. According to Embodiment #2-2, the REG defined in Embodiment #1-2 may be replaced with the REG bundle. That is, according to Embodiment #2-2, a resource/resource group corresponding to one or more DFT blocks may be composed of one REG bundle. At this time, N1 and/or N2 may be predefined (by the BS) or may be configured/instructed (by the BS) (e.g., CORESET configuration information). For example, it is assumed that the REG bundle is composed of two REGs (each REG may correspond to one DFT block), each DFT-s-OFDM is composed of two DFT blocks, and CORESET is configured as two DFT-s-OFDM symbols. Under this assumption, the REG bundle may be configured as a combination of n1=2 and n2=1 according to the time-first manner (1), or may be configured as a combination of n1=1 and n2=2 according to the frequency-first or virtual time-first manner (2). That is, the REG bundle defined in Embodiment #2-2 may be composed of a resource/resource group corresponding to one or more DFT blocks. At this time, one or more DFT blocks may correspond to one DFT-s-OFDM symbol (e.g., n1=1, n2=2), or may be matched across a plurality of DFT-s-OFDM symbols (e.g., n1=2, n2=1).
2-3: An REG may be configured as in Embodiment #1-3, and one REG bundle may be defined as a combination of N1 DFT-s-OFDM symbols and N3 virtual time domain sample groups (e.g., K' samples in Method #3 constitute one group). For example, as shown in Embodiment #1-3, resources are grouped in units of a virtual time domain sample. As shown in Embodiment #2-3, the REG defined in Embodiment #1-3 may be replaced with the REG bundle. That is, according to Embodiment #2-3, some virtual time domain resources/resource groups in one DFT block may be configured as one REG bundle. At this time, N1 and/or N3 may be predefined or configured/instructed (by the base station) (e.g., CORESET configuration information). As an example, when the REG bundle is composed of two REGs (here, each REG may correspond to K' (=12) samples) and CORESET is configured as two DFT-s-OFDM symbols, the REG bundle may be configured as a combination of n1=2 and n3=1 in the time-first manner (1), or may be configured as a combination of n1=1 and n3=2 in the frequency-first or virtual time-first manner (2). That is, the REG bundle defined in Embodiment #2-3 may be composed of some virtual time domain samples in one DFT block. In this case, some virtual time domain samples in one DFT block may be referred to as one virtual time domain sample group. In addition, according to Embodiment #2-3, one REG bundle may be composed of a plurality of virtual time domain sample groups in one DFT-s-OFDM symbol (n1=1, n3=2), or may also be composed of a plurality of virtual time domain sample groups (n1=2, n3=1) across the plurality of DFT-s-OFDM symbols.

[Embodiment #3]: CCE Configuration Method

In the method of Embodiment #1, each CCE may be configured by replacing (plural) REGs with CCEs. Specifically, according to the above-described Method #1, all resources/resource groups in one DFT-s-OFDM symbol may be composed of one CCE. According to the above-described Method #2, all virtual time domain resources/resource groups in one DFT block may be composed of one CCE. According to the above-described Method #3, some virtual time domain resources/resource groups within one DFT block may be composed of one CCE.

3-1: REG is configured as in Embodiment #1-1, N (e.g., N is 1 or 2) DFT-s-OFDM symbols may be defined as one CCE, and N may be predefined (by the base station) or configured/instructed (e.g., CORESET configuration information). Specifically, as shown in Embodiment #3-1, REG defined in the method shown in Embodiment #1-1 may be replaced with CCE. For example, as shown in Embodiment #1-1, resources may be grouped in units of DFT-s-OFDM symbols, but according to Embodiment #3-1, all resources/resource groups in one DFT-s-OFDM symbol (n=1) may be defined as one CCE. Alternatively, according to an embodiment, all resources/resource groups in the plurality of DFT-s-OFDM symbols (e.g., n=2) may be defined as one CCE.

3-2: REG may be configured as in Embodiment #1-2, and one CCE may be defined as a combination of N1 DFT-s-OFDM symbols and N2 DFT blocks (or N2 DFT block groups). For example, as in Embodiment #1-2, resources are grouped based on a DFT block, and REG defined in Embodiment #1-2 may be replaced with the CCE according to Embodiment #3-2. That is, according to Embodiment #3-2, resources/resource groups corresponding to one or more DFT blocks may be composed of one CCE. At this time, the one or more DFT blocks may correspond to one DFT-s-OFDM symbol (n1=1), and may correspond to a plurality of DFT-s-OFDM symbols (n1=2). At this time, n1 and/or n2 may be predefined or may be configured/instructed (by the base station) (e.g., CORESET configuration information). In one example, one CCE may include 6 REGs (each REG may correspond to one DFT block), each DFT-s-OFDM symbol may include three DFT blocks. When CORESET is set to 3 DFT-s-OFDM symbols, the CCE may be defined as a resource/resource group corresponding to a plurality of DFT blocks within a plurality of DFT-s-OFDM symbols. Specifically, the REG bundle may be configured as a combination of n1=3 and n2=2 according to the time-first manner (1), or may be configured as a combination of n1=2 and n2=3 according to the frequency-first or virtual time-first manner (2).

3-3: REG is configured as in Embodiment #1-3, and one CCE may be defined as one CCE according to a combination of N1 DFT-s-OFDM symbols and N3 virtual time domain sample groups (e.g., K' samples in Method #3 may construct one group). At this time, n3 may have the same meaning as N3 used in Embodiment #2, and n1 and/or n3 may be predefined or configured/instructed (by the base station) (e.g., CORESET configuration information). As an example, it is assumed that the REG bundle is composed of 6 REGs (here, each REG may correspond to K' (=12) samples), each DFT-s-OFDM symbol is composed of three DFT blocks, and CORESET is configured as three DFT-s-OFDM symbols. Under this assumption, the REG bundle may be configured as a combination of n1=3 and n3=2 according to the time-first manner (1), or may be configured as a combination of n1=2 and n3=3 according to the frequency-first or virtual time-first manner (2).

[Embodiment #4]: PDCCH Configuration Method

In the method of Embodiment #4, each PDCCH (or AL) may be configured by replacing one or more CCEs with a PDCCH (or AL).

4-1: One CCE is configured as in Embodiment #1-1, and n (e.g., n is 1 or 2) DFT-s-OFDM symbols may be defined as one PDCCH (or AL), and the value of n may be predefined or configured/instructed (by the base station) (e.g., CORESET configuration information). Specifically, according to Embodiment #4-1, one CCE may be defined as all resources/resource groups in one DFT-s-OFDM symbol (e.g., K resources of FIG. 9, (K1+K2) resources of FIGS. 10 and 11). In this case, CCE may be replaced with PDCCH or AL. That is, PDCCH or AL may be composed of all resources/resource groups in one DFT-s-OFDM symbol (e.g., n=1). In addition, according to an embodiment, PDCCH or AL may also be composed of all resources/resource groups in a plurality of DFT-s-OFDM symbols (e.g., n=2).

4-2: One CCE is configured as in Embodiment #1-2, and one PDCCH (or AL) may be defined as a combination of n1 DFT-s-OFDM symbols and n2 DFT blocks (or n2 DFT block groups), and n1 and/or n2 values may be predefined or configured/instructed (by the base station) (e.g., CORESET configuration information). Specifically, according to Embodiment #4-2, a CCE may be configured as a resource/resource group corresponding to one or more DFT blocks within one DFT-s-OFDM symbol. At this time, the CCE may be replaced with a PDCCH or AL. For example, a PDCCH or AL may be configured as a resource/resource group corresponding to one or more DFT blocks. Here, the resource/resource group corresponding to the one or more DFT blocks may correspond to one DFT-s-OFDM symbol (e.g., n1=1), or may correspond to a plurality of DFT-s-OFDM symbols (e.g., n1=2). That is, one PDCCH or one AL may be defined as a combination of n1 DFT-s-OFDM symbols and n2 DFT blocks. At this time, n1 and n2 may have the same meaning as n1 and n2 used in Embodiment #2. As an example, it is assumed that one PDCCH is composed of two ALs (here, each CCE may correspond to one DFT block), each DFT-s-OFDM symbol is composed of two DFT blocks, and CORESET is configured as two DFT-s-OFDM symbols. Under this assumption, the REG bundle may be configured as a combination of n1=2 and n2=1 according to the time-first manner (1), or may be configured as a combination of n1=2 and n2=2 according to the frequency-first or virtual time-first manner (2).

4-3: One CCE may be configured as in Embodiment #1-3, and one PDCCH (or AL) may be defined as a combination of n1 DFT-s-OFDM symbols and n3 virtual time domain sample groups (e.g., K' samples in Method #3 may construct one group). Specifically, according to Embodiment #4-3, one CCE may be composed of some virtual time domain resources/resource groups in one DFT block of one DFT-s-OFDM symbol (here, some virtual time domain samples within one DFT block may be referred to as a virtual time domain sample group), and the CCE may be replaced with the PDCCH or AL. For example, a PDCCH or AL may be composed of one or more virtual time domain sample groups. In this case, one or more virtual time domain sample groups may be included in one DFT-s-OFDM symbol (n1=1), or may be included in a plurality of DFT-s-OFDM symbols (n1=2). At this time, n1 and/or n3 may be predefined or configured/instructed (by the base station) (e.g., CORESET configuration information). As an example, it is assumed that one PDCCH is composed of two ALs (here, each CCE may correspond to K' (=12) samples), each DFT-s-OFDM symbol is composed of two DFT blocks, and CORESET is configured as two DFT-s-OFDM symbols. Under this assumption, the REG bundle may be configured as a combination of n1=2 and n3=1 according to the time-first manner (1), or may be configured as a combination of n1=1 and n3=2 according to the frequency-first or virtual time-first manner (2).

Methods used in the above-described embodiments or methods used in the above-described proposals may be set/configured in different ways according to a UE, a DCI format, a DCI type (or UE-common, UE-group-common, or UE-specific) or a search space type (a common search space or a UE-specific search space). For example, the above-described embodiment #4-3 may be applied to UE-specific DCI, and the above-described embodiment #4-1 may be applied to the group-common DCI.

In each of the above embodiments or proposed methods, when one resource group is configured through n1 DFT-s-OFDM symbols, n1 DFT-s-OFDM symbols may be consecutive symbols or non-consecutive symbols or may be a plurality of bundles composed of consecutive symbols. In this case, the plurality of bundles may be arranged in a contiguous or non-contiguous manner. According to embodiments, the bundle may also be referred to as a group or a symbol group, but is not limited thereto. More specifically, a corresponding configuration method may be set for each specific period, and the set symbol configuration method may also be applied for a set specific period.

In addition, in consideration of UE complexity for blind detection of the control channel (e.g., PDCCH), only a PDCCH of one UE can be mapped/transmitted to one slot. That is, the UE can expect that only the PDCCH of a specific UE is transmitted per slot within the DFT-s-OFDM based slot. In this case, the PDCCH of one UE may include one or more PDCCHs. Accordingly, when it is impossible for the UE to expect PDCCH transmission within the corresponding DFT-s-OFDM based slot in a situation where CORESET is configured in the DFT-s-OFDM based slot, the PDCCH monitoring (e.g., blind detection) operation can be skipped or omitted.

In addition, as shown in FIGS. 10 and 11, the UE may have to receive a PDCCH through a plurality of DFT blocks even in one DFT-s-OFDM-based slot. That is, PDCCH reception complexity of the UE may be related to the number of DFT blocks corresponding to one PDCCH or CORESET, and the number of DFT-s-OFDM symbols may also be considered. Specifically, the number of DFT blocks that can be maximally assumed for PDCCH reception during a specific time domain (e.g., X1 msec or X2 slot) may be reported by UE capability signaling. When the number of DFT blocks greater than those of the UE capability is set for PDCCH reception during a specific time domain (e.g., a plurality of CORESETs overlaps one slot), the UE may not perform blind detection either for some PDCCHs or for a PDCCH corresponding to the search space set according to a specific rule (that has priority over a common search space or priority over a search space having the lowest index). For example, an operation state in which blind detection is not performed may include skipping/omitting such blind detection.

In addition, calculation for a margin of a processing time for each of PDSCH reception, HARQ-ACK transmission corresponding to a PDSCH, reception of PDCCH (e.g., UL grant) configured to schedule a PUSCH, and/or transmission of a scheduled PUSCH may be related to the number of DFT blocks corresponding to the PDCCH or CORESET, and the number of DFT-s-OFDM symbols may also be considered. For example, as the number of DFT blocks corresponding to the PDCCH or CORESET increases, a margin of a processing time for each of PDSCH reception, HARQ-ACK transmission corresponding to a PDSCH, reception of PDCCH configured to schedule a PUSCH, and/or transmission of a scheduled PUSCH may be high. In this case, the number of DFT-s-OFDM symbols may also be considered.

3.2 PDCCH DM-RS Multiplexing Method

Hereinafter, a multiplexing method between PDCCH data (symbol) and DM-RS will be proposed. In this case, PDCCH data may mean DCI transmitted through the PDCCH, and may be referred to as a DCI signal according to an embodiment. The DM-RS may refer to a PDCCH DM-RS used to decode a PDCCH, and may be referred to as a DM-RS signal or a DM-RS sequence according to an embodiment.

[Method #A] Multiplexing Method at DFT-s-OFDM Symbol Level

Method #A may be a multiplexing method in which DFT-s-OFDM symbol #1 composed of only PDCCH data and DFT-s-OFDM symbol #2 composed of only the PDCCH DM-RS are TDMed. In this case, in DFT-s-OFDM symbol #2 composed of only the PDCCH DM-RS, DM-RSs corresponding to multiple PDCCHs or DM-RSs corresponding to REG/REG bundle/CCE can be multiplexed. More specifically, the plurality of DM-RS resources may be multiplexed according to the following operations.

Option 1) multiplexing by applying Pre-DFT OCC (Orthogonal Cover Code).

Option 2) transmitting by grouping in the virtual time domain (e.g., a group may be formed with consecutive samples, one or more DM-RS sequences may be mapped to one or more groups, and one or more DM-RSs may be mapped to one or more DFT blocks.

Option 3) transmitting by grouping in the frequency domain (e.g., a group may be formed with consecutive subcarriers and one or more DM-RS sequences are mapped for one or more groups, and a group may be formed with isolated subcarriers and one or more DM-RS sequences are mapped to the formed group).

At this time, since a plurality of DMRS sequences may be transmitted in one DFT-s-OFDM symbol, different CSs (cyclic shifts), a phase shift, and/or a root index may be applied between sequences to reduce a PAPR of the transmission end (transmitter). In addition, the DFT-S-OFDM symbol (e.g., symbol index=1), which is an odd index in the CORESET consisting of odd (e.g., three) DFT-s-OFDM symbols, may be configured as a DM-RS, thereby obtaining an advantage in terms of channel estimation performance and RS overhead. At this time, the symbol index in the CORESET may start from zero. In addition, the DFT-s-OFDM symbol (e.g., symbol index=0, 2), which is an even index in a CORESET consisting of even (e.g., two) DFT-s-OFDM symbols, may be configured as a DM-RS, thereby obtaining an advantage in terms of PDCCH decoding latency. At this time, the symbol index in CORESET may start from 0. Alternatively, a position of a symbol composed of a DM-RS in the CORESET and/or a symbol in which only DCI is transmitted without transmission of the DM-RS may be configured.

As another example, a DCI signal constituting a single PDCCH and a DM-RS signal may be mapped/transmitted to different OFDM symbols. In this case, the DCI signal is input to the DFT block and is then transmitted to the DFT-s-OFDM symbol through the IFFT block. In addition, the DM-RS signal may be configured in a format in which a sequence having a low PAPR (e.g., a ZC (Zadoff-Chu) sequence) is transmitted through a process of IFFT with applying of the DFT or without applying of the DFT. At this time, in order to distinguish between different UEs or between different PDCCHs, a plurality of DM-RS sequences may be FDMed- and/or CDMed and mapped. Here, the single DM-RS sequence may be mapped/transmitted to the set of consecutive (localized) REs or the set of non-consecutive (distributed) REs. On the other hand, one DM-RS sequence may be paired or associated with one CCE, and thus one or more pairs of CCE and DM-RS (i.e., one or more CCE and DM-RS pairs) may be combined to constitute one PDCCH. Alternatively, one DM-RS sequence may be paired or associated with one REG or one REG bundle, so that one or more pairs of REG (or REG bundle) and DM-RS (i.e., one or more REG and DM-RS pairs) are combined to constitute one CCE.

[Method #B] Multiplexing Method at Virtual Time Domain Sample Level

Unlike Method #A, in Method #B, a method for mapping the PDCCH data (symbol) to the DM-RS within the same DFT-s-OFDM (symbol) is proposed. Hereinafter, for convenience of description, a DM-RS corresponding to one PDCCH (or REG/REG bundle/CCE) may be defined as one DM-RS group. At this time, at least one DM-RS group is configured in a localized structure rather than a distributed structure within the virtual time domain, thereby minimizing interference between different DM-RS groups. In addition, in consideration of interference between the RS groups or interference between the DM-RS group and the PDCCH data (symbol), (a) a guard sample may be inserted between the DM-RS groups, and/or (b) a guard sample may be inserted between the DM-RS group and the PDCCH data (symbol). As described above, the guard sample may include a known sample carrying a null sample or a specific signal.

As another example, the DCI signal and the DM-RS signal (that are input to the same DFT block) constituting a single PDCCH may be mapped/transmitted to different virtual time domain sample groups (input to the same DFT block). At this time, a guard interval/sample (i.e., null samples or known samples carrying a specific signal) may be inserted between the corresponding DCI sample group and the DMRS sample group. In this case, a combination of the DCI sample group and the DMRS sample that are input to the single DFT block may be defined as one REG (or one REG bundle), and a plurality of DFT blocks may be combined to constitute one CCE. Alternatively, a combination of the DCI sample group and the DM-RS sample group that are input to a single DFT block may be defined as one CCE, and one or more DFT blocks may be coupled to constitute one PDCCH.

In the resource grouping method proposed above, Option A) in each resource group, the structure of the present disclosure may be configured to have the DM-RS sequence in the same manner as suggested in the above section 3.2; and Option B) a resource group and a DM-RS sequence linked to each resource group may be configured separately from each other (without including the DM-RS sequence in each resource group), and resources formed by adding the DM-RS sequence to the resource group may be defined as REG/REG bundle/CCE/PDCCH. Alternatively, according to an embodiment, only a resource group without a DM-RS sequence may be defined as REG/REG bundle/CCE/PDCCH.

Hereinafter, a specific embodiment of a method for configuring a resource group (e.g., REG/REG bundle/CCE/PDCCH) based on the above-described Option (A) and Option (B) methods will be described in detail.

[Embodiment #A] Combination of Option A and Method #A

As in the above-described method proposed in Section 3.1, when n1 DFT-s-OFDM symbols and n2 virtual time domain samples form only one resource group, some DFT-s-OFDM symbols from among n1 DFT-s-OFDM symbols may be composed of only the DM-RS and the remaining DFT-s-OFDM symbols may be composed of only PDCCH data. Specifically, according to the above-described Method #A, since PDCCH data and DM-RS are multiplexed at the DFT-s-OFDM symbol level, one DFT-s-OFDM symbol may consist of only PDCCH data or DM-RS. Accordingly, n1 DFT-s-OFDM symbols may include some DFT-s-OFDM symbols composed of only DM-RSs and the remaining DFT-s-OFDM symbols composed of only PDCCH data.

[Embodiment #B] Combination of Option a and Method #B

As in the above-described method proposed in Section 3.1, when n1 DFT-s-OFDM symbols and n2 virtual time domain samples form one resource group, some of the n2 samples in each DFT-s-OFDM symbol may be composed of DM-RS, and the remaining samples may be composed of PDCCH data. Specifically, as in Method #B described above, PDCCH data and DM-RS may be multiplexed at a virtual time domain sample level. Accordingly, PDCCH data and DM-RS may be mapped together even within one DFT-s-OFDM symbol, and PDCCH data and DM-RS may be divided into different sample groups within one DFT-s-OFDM symbol. For example, the PDCCH data and the DM-RS can correspond to different virtual time domain sample groups input to one DFT block. In this case, in order to minimize inter-signal interference, the DM-RS may be configured as a localized structure in the virtual time domain.

[Embodiment #C] Combination of Option B and Method #A

As in the above-described method proposed in Section 3.1, when one resource group is formed with n1 DFT-s-OFDM symbols and n2 virtual time domain samples, n3 virtual time domain samples composed of the corresponding DM-RSs (separately from n1 DFT-s-OFDM symbols) may be configured/defined. In this case, a resource obtained by adding n3 DFT-s-OFDM symbols to the sum of n1 DFT-s-OFDM and n2 virtual time domain samples may be redefined as one resource group.

[Embodiment #D] Combination of Option B and Method #B

As in the above-described method proposed in Section 3.1, when one resource group is formed with n1 DFT-s-OFDM symbols and n2 virtual time domain samples, n3 virtual time domain samples composed of the corresponding DM-RSs (separately from n2 samples) may be configured/ defined within n1 DFT-s-OFDM symbols. In this case, a resource obtained by adding up to n3 virtual time domain samples may also be redefined as one resource group.

Figure 13:
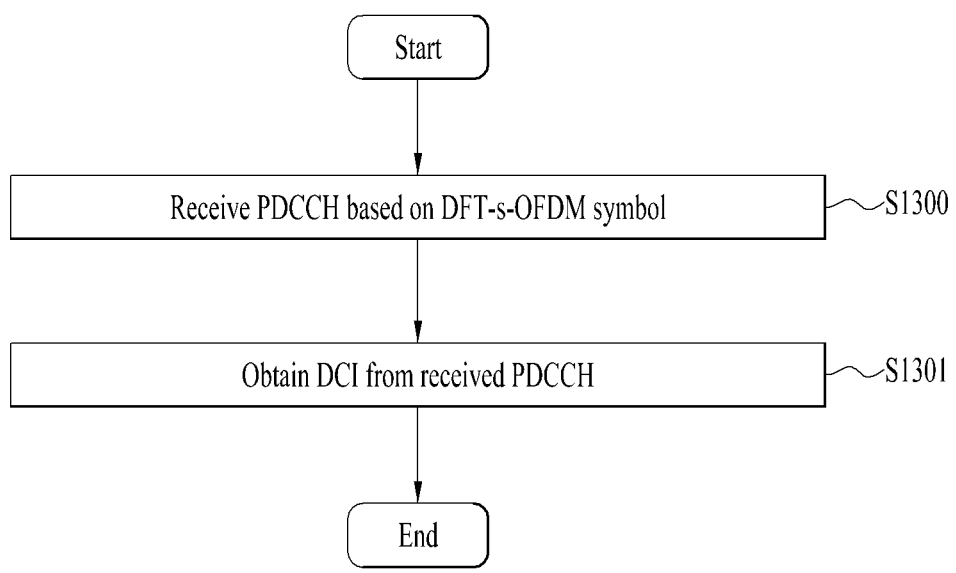
FIGS. 13 and 14 are flowcharts illustrating operations of the UE and the BS according to an embodiment of the present disclosure.
Figure 14:
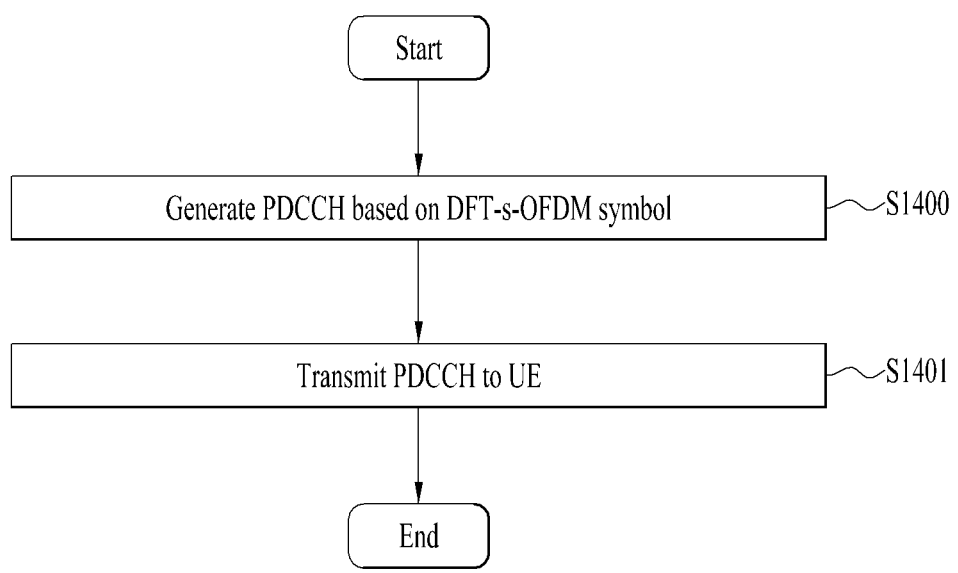

FIGS. 13 and 14 are flowcharts illustrating operations of the UE and the BS according to an embodiment of the present disclosure.

The user equipment (UE) according to an embodiment of the present disclosure may receive a Physical Downlink Control Channel (PDCCH) based on a Discrete Fourier Transform-spread-Orthogonal Frequency Division Multiplexing (DFT-s-OFDM) symbol from the base station (BS) (S1300). Here, DFT-s-OFDM refers to a method for applying DFT precoding at the front end of IFFT according to the OFDM scheme. In this case, the PDCCH may be mapped/transmitted to one or more DFT-s-OFDM symbols. Specifically, the PDCCH may be generated by applying one or more DFT operations and one IFFT operation to a plurality of modulation symbols corresponding to each of the one or more DFT-s-OFDM symbols. In this case, the modulation symbol may refer to a modulation symbol described in PDCCH modulation in Section 7.3.2.4 of Table 3 above, and may correspond to the above-described virtual time domain sample. In addition, the DFT operation and the IFFT operation may be represented by the DFT block and IFFT block of Sections 3.1 and 3.2 above. When the number of a plurality of modulation symbols corresponding to each of the DFT-s-OFDM symbols is K, the input size of one or more DFT blocks applied to the K modulation symbols may be equal to or smaller than K. For example, as shown in FIG. 9, when the input size of the DFT block is K, one K-point DFT operation may be applied to K modulation symbols. In addition, as shown in FIGS. 10 and 11, when two DFT operations are applied to K modulation symbols, the input size of each of the two DFT operations may be smaller than K. Specifically, two DFT blocks may include a K1 point DFT block 1000 and a K2 point DFT block 1001, and each of K1 and K2 may be smaller than K(=K1+K2). In this case, the K1 point DFT block 1000 and the K2 point DFT block 1001 may be applied in parallel. That is, the K1 point DFT block may be applied to K1 samples among K modulation symbols, and the K2 point DFT block may be applied to the remaining K2 samples. As one or more DFT blocks are applied to the K modulation symbols, the K modulation symbols may be converted into K frequency domain symbols. In addition, IFFT is applied to the K frequency domain symbols to generate a DFT-s-OFDM symbol-based signal (e.g., PDCCH).

In addition, a plurality of modulation symbols being input for at least one DFT operation among one or more DFT operations applied to K modulation symbols may constitute one resource group. At this time, one resource group may include an REG, an REG bundle, or a CCE, without being limited thereto. For example, as shown in FIGS. 10 and 11, when there are two DFT blocks applied to K modulation symbols, one resource group may consist of modulation symbols that are input to at least one DFT block. Specifically, as shown in FIGS. 10 and 11, when two DFT blocks include the K1 point DFT block and the K2 point block, one resource group may include K1, K2, or (K1+K2) modulation symbols. According to the proposed method, modulation symbols located at the front end of the DFT block may be grouped. Specifically, a plurality of modulation symbols may be grouped based on the number of applied DFT blocks. Modulation symbols being input to at least one DFT block may be configured as one resource group (e.g., REG, REG bundle, or CCE).

The UE may obtaining DCI from the received PDCCH (S1301). When the DCI includes scheduling information of the PDSCH, the UE may receive the PDSCH from the base station (BS) based on the PDCCH. In addition, the UE may transmit a HARQ-ACK corresponding to the received PDSCH to the base station (BS). According to the NR system, a minimum processing time may be defined between a time when the UE receives the PDSCH and the other time when the HARQ-ACK is transmitted. In this case, the processing time may be determined based on the number of DFT blocks corresponding to each of the aforementioned DFT-s-OFDM symbols. Specifically, as the number of DFT blocks increases, the time for the UE to process the received PDSCH may increase.

Further, according to an embodiment, a DM-RS may be received together with a PDCCH based on a DFT-s-OFDM symbol. For example, the DM-RS and the PDCCH may be multiplexed in the same DFT-s-OFDM symbol and then transmitted. Accordingly, a plurality of modulation symbols corresponding to one DFT-s-OFDM symbol may include PDCCH modulation symbol(s) and DM-RS modulation symbol(s). In this case, in order to prevent interference between two signals, a guard symbol may be located between the PDCCH modulation symbols and the DM-RS modulation symbols. For example, the guard symbol may be a null symbol or a predetermined particular symbol (or a known symbol), without being limited thereto. In addition, according to an embodiment, PDCCH modulation symbols and DM-RS modulation symbols may be input to one DFT block, and a guard symbol for preventing interference may be included between the PDCCH modulation symbols and the DM-RS modulation symbols.

According to the above method, by transmitting and receiving a PDCCH based on a DFT-s-OFDM symbol, a downlink signal can be transmitted and received by the base station (BS) in consideration of PAPR. In particular, as the frequency band increases (e.g., 52.6 GHz), there is a need for the BS to consider the linearity of the power amplifier (PA). In addition, in the above-described methods, when transmitting and receiving a PDCCH based on the DFT-s-OFDM symbol, virtual time domain samples can be grouped using a new method.

FIG. 14 is a flowchart illustrating the operations of the base station (BS) according to one embodiment of the present disclosure.

The base station (BS) according to one embodiment may generate a PDCCH based on DFT-s-OFDM (S1400). The process of generating the DFT-s-OFDM based PDCCH may be equally applied in the same manner as described in FIGS. 9 to 11 and 13.

In addition, the base station (BS) may transmit the generated PDCCH to the UE (S1401). When the DCI transmitted by the PDCCH includes scheduling information of the PDSCH, the base station (BS) may transmit the PDSCH to the UE and may receive a HARQ-ACK for the transmitted PDSCH from the UE. As described above, the processing time between the time point at which the UE receives the PDSCH and the other time point at which the HARQ-ACK is transmitted may be determined based on the number of DFT blocks applied to a plurality of modulation symbols corresponding to each of the DFT-s-OFDM symbols.

In addition, the base station (BS) according to an embodiment may transmit a DM-RS to the UE along with the PDCCH based on the DFT-s-OFDM symbol. Specifically, the PDCCH and the DM-RS may be multiplexed within the same DFT-s-OFDM symbol and transmitted to the UE. For example, a plurality of modulation symbols corresponding to one DFT-s-OFDM symbol may include PDCCH modulation symbol(s) and DM-RS modulation symbol(s). In this case, in order to prevent interference between the two signals, a guard symbol may be located between the PDCCH modulation symbols and the DM-RS modulation symbols. For example, the guard symbol may be a null symbol or a predetermined particular symbol, without being limited thereto. In addition, according to an embodiment, PDCCH modulation symbols and DM-RS modulation symbols may be input to one DFT block in a virtual time domain, and a guard symbol for preventing interference may be included between PDCCH modulation symbols and DM-RS modulation symbols.

Figure 15:
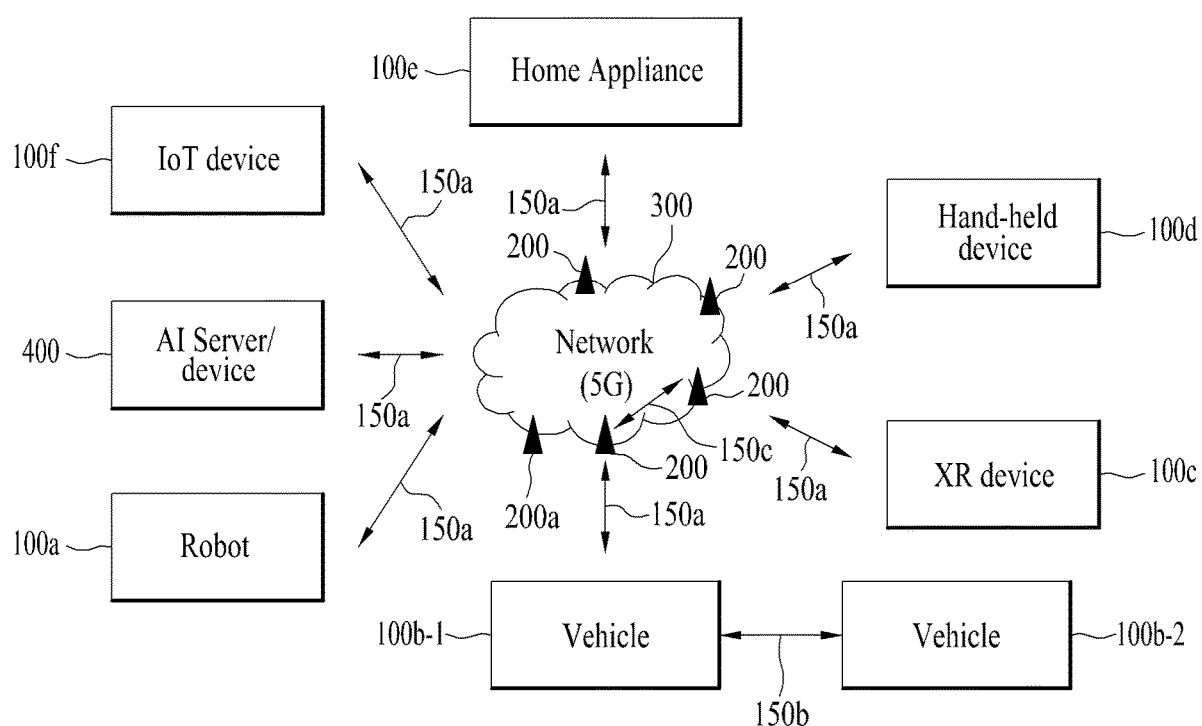
FIGS. 15 and 16 illustrate examples of a communication system and a wireless device according to the present disclosure.

FIG. 15 illustrates a communication system applied to the present disclosure.

Referring to FIG. 15, the communication system applied to the present disclosure includes wireless devices, base stations (BSs), and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
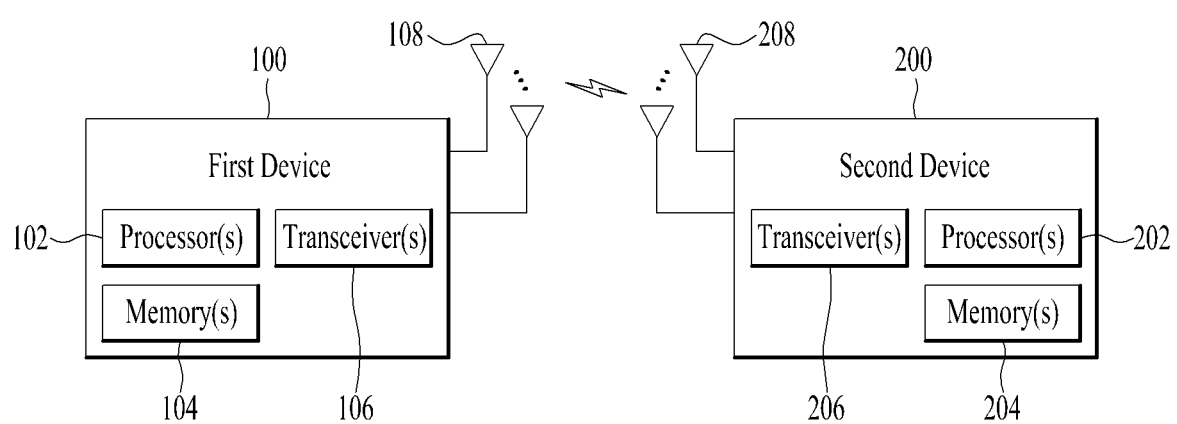

FIG. 16 illustrates wireless devices applicable to the present disclosure.

Here, wireless communication technologies implemented in the wireless devices (100, 200) of the present specification may include LTE, NR, and 6G, as well as Narrowband Internet of Things (NB-IoT) for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (100, 200) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (100, 200) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

Referring to FIG. 16, a first wireless device 100 and a second wireless device 200 may transmit radio signals through a variety of RATs (e.g., LTE and NR). Here, the {first wireless device 100, second wireless device 200} may correspond to the {wireless device 100x, BS 200} and/or {wireless device 100x, wireless device 100x} of FIG. 15.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to the present disclosure, at least one memory (e.g., 104 or 204) may store instructions or programs which, when executed, cause at least one processor operably coupled to the at least one memory to perform operations according to various embodiments or implementations of the present disclosure.

According to the present disclosure, a computer-readable storage medium may store at least one instruction or computer program which, when executed by at least one processor, cause the at least one processor to perform operations according to various embodiments or implementations of the present disclosure.

According to various embodiments of the present disclosure, a processing device or apparatus may include the at least one processor and at least one computer memory connected to the at least one processor. The at least one computer memory may store instructions or programs which, when executed, cause the at least one processor operably coupled to the at least one memory to perform operations according to various embodiments or implementations of the present disclosure.

Figure 17:
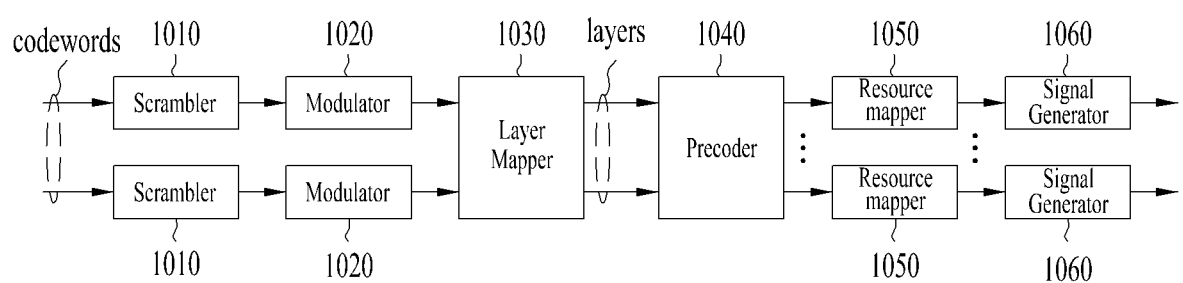
FIG. 17 is a block diagram illustrating an example of a signal processing circuit for a transmission (Tx) signal.

FIG. 17 illustrates a signal process circuit for a transmission signal.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 16 may be implemented by the processors 102 and 202 and/or the transceivers 106 and 206 of FIG. 17. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Figure 18:
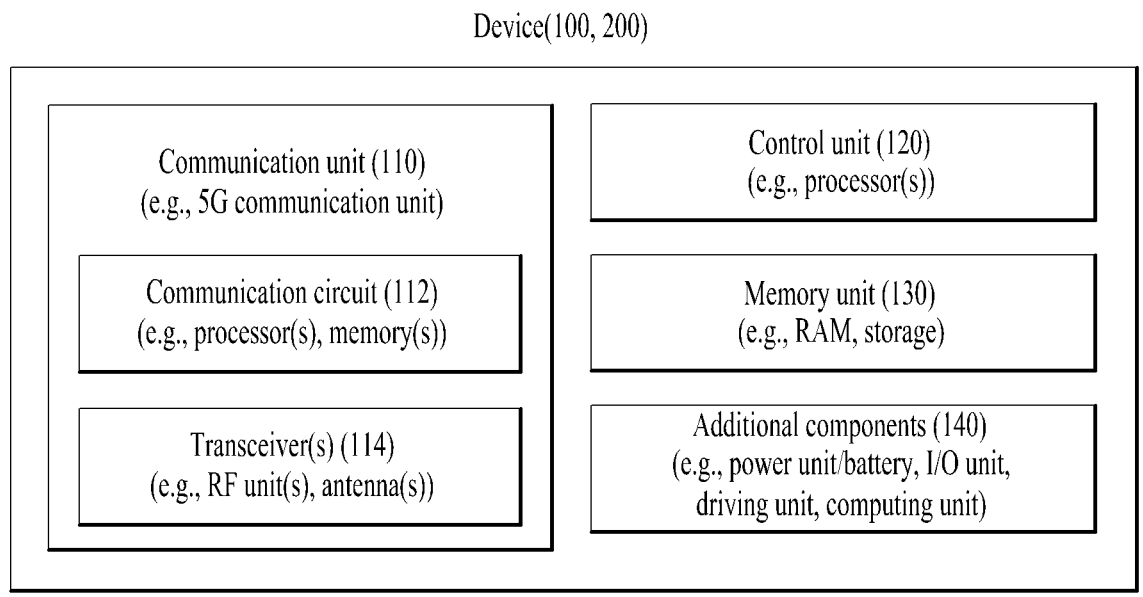
FIG. 18 illustrates another example of wireless devices applied to the present disclosure.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated into modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 18 illustrates another example of wireless devices applied to the present disclosure. The wireless devices may be implemented in various forms according to use-cases/services (refer to FIG. 15).

Referring to FIG. 18, wireless devices 100 and 200 may correspond to the wireless devices 100 and 200 of FIG. 16 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically coupled to the communication unit 110, the memory unit 130, and additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcasting terminal, a hologram device, a public safety device, an MTC device, a medicine device, a FinTech device (or a finance device), a security device, a climate/environment device, the AI server/device (400 of FIG. 15), the BSs (200 of FIG. 15), a network node, etc. The wireless device may be mobile or fixed according to a use-case/service.

In FIG. 18, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

FIG. 19 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain vehicle state information and/or ambient environment information. The autonomous driving unit 140d may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other equipment in a wireless mobile communication system.

The invention claimed is:

1. A method for receiving a downlink signal by a user equipment (UE) in a wireless communication system, the method comprising:
   receiving, from a base station (BS), a physical downlink control channel (PDCCH) based on a DFT-s-OFDM (Discrete Fourier Transform-spread-Orthogonal Frequency Division Multiplexing) symbol; and
   obtaining downlink control information (DCI) from the received PDCCH,
   wherein the DFT-s-OFDM symbol for the PDCCH is generated by i) applying one or more DFT operations to modulation symbols for the PDCCH and ii) applying one inverse fast Fourier transform (IFFT) operation to an output of the one or more DFT operations, and
   wherein a plurality of modulation symbols being input for at least one of the one or more DFT operations, among the modulation symbols for the PDCCH, constitutes one resource group.

2. The method according to claim 1, wherein the one resource group includes a resource element group (REG), a REG bundle, or a control channel element (CCE).

3. The method according to claim 2, wherein the REG bundle and the CCE are determined based on the number (N1) of DFT-s-OFDM symbols configured by the BS and the number (N2) of DFT operations corresponding to each of the N1 DFT-s-OFDM symbols.

4. The method according to claim 1, wherein an input size of each of the one or more DFT operations is equal to or smaller than an input size of the IFFT operation.

5. The method according to claim 1, further comprising:
   receiving, from the BS, a physical downlink shared channel (PDSCH) based on the PDCCH; and
   transmitting, to the BS, a HARQ-ACK (hybrid automatic repeat and request-acknowledgement/negative-ACK) corresponding to the PDSCH,
   wherein a processing time between a reception time point of the PDSCH and a transmission time point of the HARQ-ACK is determined based on the number of the one or more DFT operations.

6. The method according to claim 1, wherein the DCI includes scheduling information of a physical uplink shared channel (PUSCH), the method further comprises transmitting the scheduled PUSCH, wherein a processing time between a reception time point of the PDCCH and a transmission time point of the PUSCH is determined based on the number of the one or more DFT operations.

7. The method according to claim 1,
   wherein a demodulation reference signal (DM-RS) is received along with the PDCCH based on the DFT-s-OFDM symbol,
   wherein a plurality of modulation symbols corresponding to the DFT-s-OFDM symbol includes modulation symbols of the PDCCH and modulation symbols of the DM-RS, and a guard symbol is located between the modulation symbols of the PDCCH and the modulation symbols of the DM-RS.

8. The method according to claim 7, wherein the guard symbol includes a null symbol or a preconfigured specific symbol.

9. The method according to claim 7, wherein the modulation symbols of the PDCCH and the modulation symbols of the DM-RS are used as inputs of one DFT operation.

10. A user equipment (UE) configured to receive a downlink signal in a wireless communication system comprising:
    at least one processor; and
    at least one computer memory operatively connected to the at least one processor, and configured to store instructions that causes the at least one processor to perform operations comprising:
    receiving, from a base station (BS), a physical downlink control channel (PDCCH) based on a DFT-s-OFDM (Discrete Fourier Transform-spread-Orthogonal Frequency Division Multiplexing) symbol; and
    obtaining downlink control information (DCI) from the received PDCCH,
    wherein the DFT-s-OFDM symbol for the PDCCH is generated by i) applying one or more DFT operations to modulation symbols for the PDCCH and ii) applying one inverse fast Fourier transform (IFFT) operation to an output of the one or more DFT operations, and
    wherein a plurality of modulation symbols being input for at least one of the one or more DFT operations, among the modulation symbols for the PDCCH, constitutes one resource group.

11. The user equipment (UE) according to claim 10, wherein the one resource group includes a resource element group (REG), a REG bundle, or a control channel element (CCE).

12. The user equipment (UE) according to claim 11, wherein the REG bundle and the CCE are determined based on the number (N1) of DFT-s-OFDM symbols configured by the BS and the number (N2) of DFT operations corresponding to each of the N1 DFT-s-OFDM symbols.

13. The user equipment (UE) according to claim 10, wherein an input size of each of the one or more DFT operations is equal to or smaller than an input size of the IFFT operation.

14. The user equipment (UE) according to claim 10, wherein the specific operations further include:
    receiving, from the BS, a physical downlink shared channel (PDSCH) based on the PDCCH; and
    transmitting, to the BS, a HARQ-ACK (hybrid automatic repeat and request-acknowledgement/negative-ACK) corresponding to the PDSCH, wherein a processing time between a reception time point of the PDSCH and a transmission time point of the HARQ-ACK is determined based on the number of the one or more DFT operations.

15. A method for transmitting a downlink signal by a base station (BS) in a wireless communication system comprising:
    generating a DFT-s-OFDM (Discrete Fourier Transform-spread-Orthogonal Frequency Division Multiplexing) symbol for a physical downlink control channel (PDCCH); and
    transmitting, to a user equipment (UE), the DFT-s-OFDM symbol for the PDCCH, wherein the DFT-s-OFDM symbol for the PDCCH is generated by i) applying one or more DFT operations to modulation symbols for the PDCCH and ii) applying one inverse fast Fourier transform (IFFT) operation to an output of the one or more DFT operations, and wherein a plurality of modulation symbols being input for at least one of the one or more DFT operations, among the modulation symbols for the PDCCH, constitutes one resource group.

16. A base station (BS) configured to transmit a downlink signal in a wireless communication system comprising:

at least one processor; and at least one computer memory operatively connected to the at least one processor, and configured to store instructions that causes the at least one processor to perform operations comprising:

generating a DFT-s-OFDM (Discrete Fourier Transform-spread-Orthogonal Frequency Division Multiplexing) symbol for a physical downlink control channel (PDCCH); and transmitting, to a user equipment (UE), the DFT-s-OFDM symbol for the PDCCH, wherein the DFT-s-OFDM symbol for the PDCCH is generated by i) applying one or more DFT operations to modulation symbols for the PDCCH and ii) applying one inverse fast Fourier transform (IFFT) operation to an output of the one or more DFT operations, and wherein a plurality of modulation symbols being input for at least one of the one or more DFT operations, among the modulation symbols for the PDCCH, constitutes one resource group.

* * * * *